United States Patent [19]

Fujino et al.

[11] Patent Number: 5,202,720
[45] Date of Patent: Apr. 13, 1993

[54] PHOTOGRAPHIC CAMERA WITH FLASH UNIT

[75] Inventors: Akihiko Fujino; Kenji Tsuji; Hidehiko Fujii; Nobuyuki Taniguchi; Sadafusa Tsuji, all of Osaka, Japan

[73] Assignee: Minolta Camera Kabushiki Kaisha, Osaka, Japan

[21] Appl. No.: 747,713

[22] Filed: Jan. 31, 1990

[30] Foreign Application Priority Data

Feb. 2, 1989 [JP] Japan ................................. 1-25411
Feb. 3, 1989 [JP] Japan ................................. 1-26402

[51] Int. Cl.$^5$ .................................... G03B 7/00
[52] U.S. Cl. ................................... 354/415; 354/474; 354/127.11; 354/149.11
[58] Field of Search ........ 354/415, 418, 419, 471–475, 354/127.11, 127.12, 127.13, 149.11, 145.1

[56] References Cited

U.S. PATENT DOCUMENTS 4,999,663 3/1991 Nakamura ........................... 354/415

Primary Examiner—Michael L. Gellner
Assistant Examiner—David M. Gray
Attorney, Agent, or Firm—Willian Brinks Olds Hofer Gilson & Lione

[57] ABSTRACT

A photographic camera which comprises an electronic flash unit for firing a flash light for illuminating a target object to be photographed when an image of the target object is desired to be exposed on a light senistive film, a preliminarily flash unit activated prior to the flash light fired by the electronic flash unit to emit a preliminary flash light necessary to cause the pupils of the target object to close, a manipulating unit for selecting a mode in which the preliminarily flash unit is activated, a determining circuit for determining the necessity of the preliminary flash light under a predetermined condition; and a display device for providing, on the basis of a result of determination made by the determining circuit, an indication that the preliminary flash light is necessary.

20 Claims, 20 Drawing Sheets

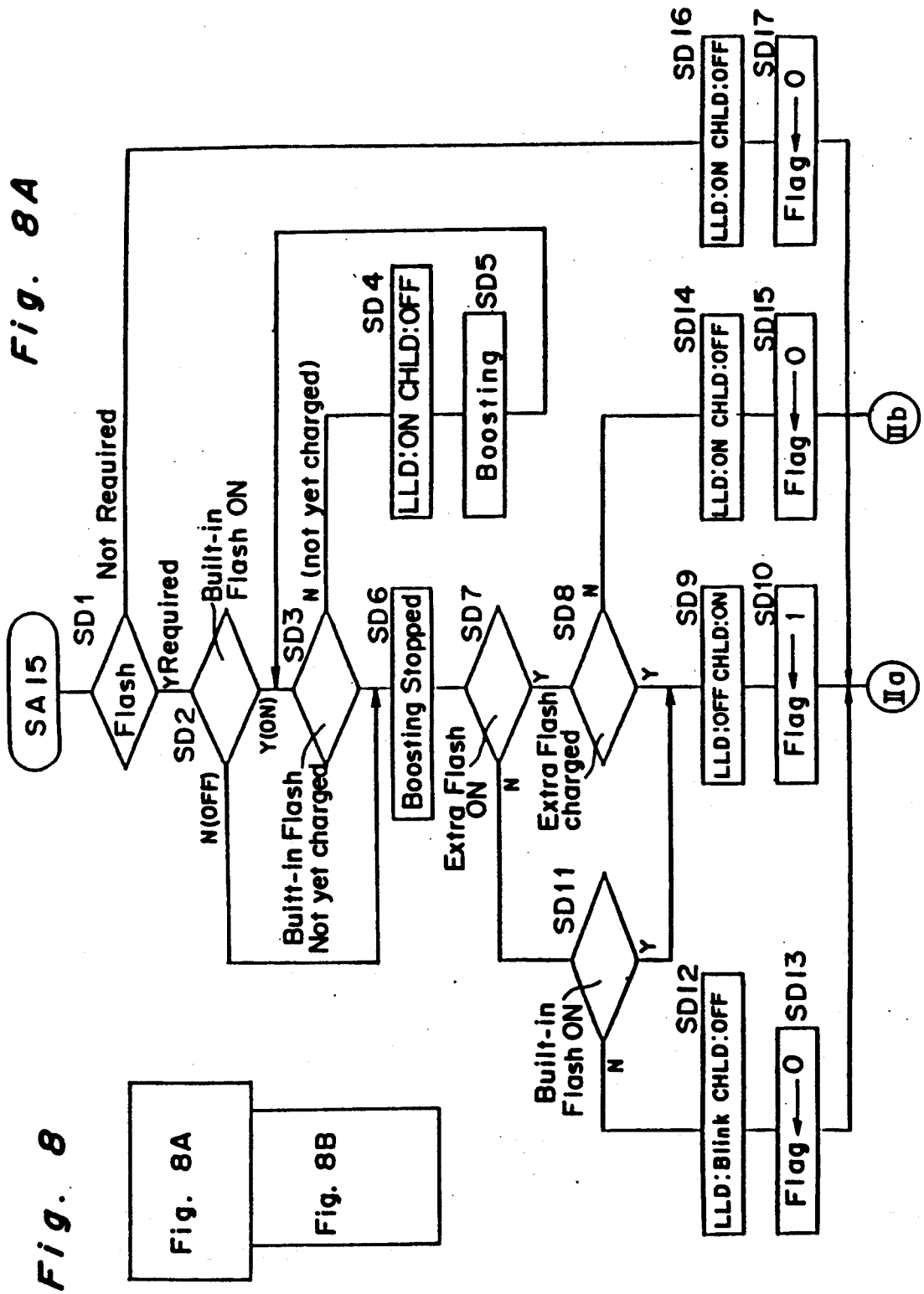

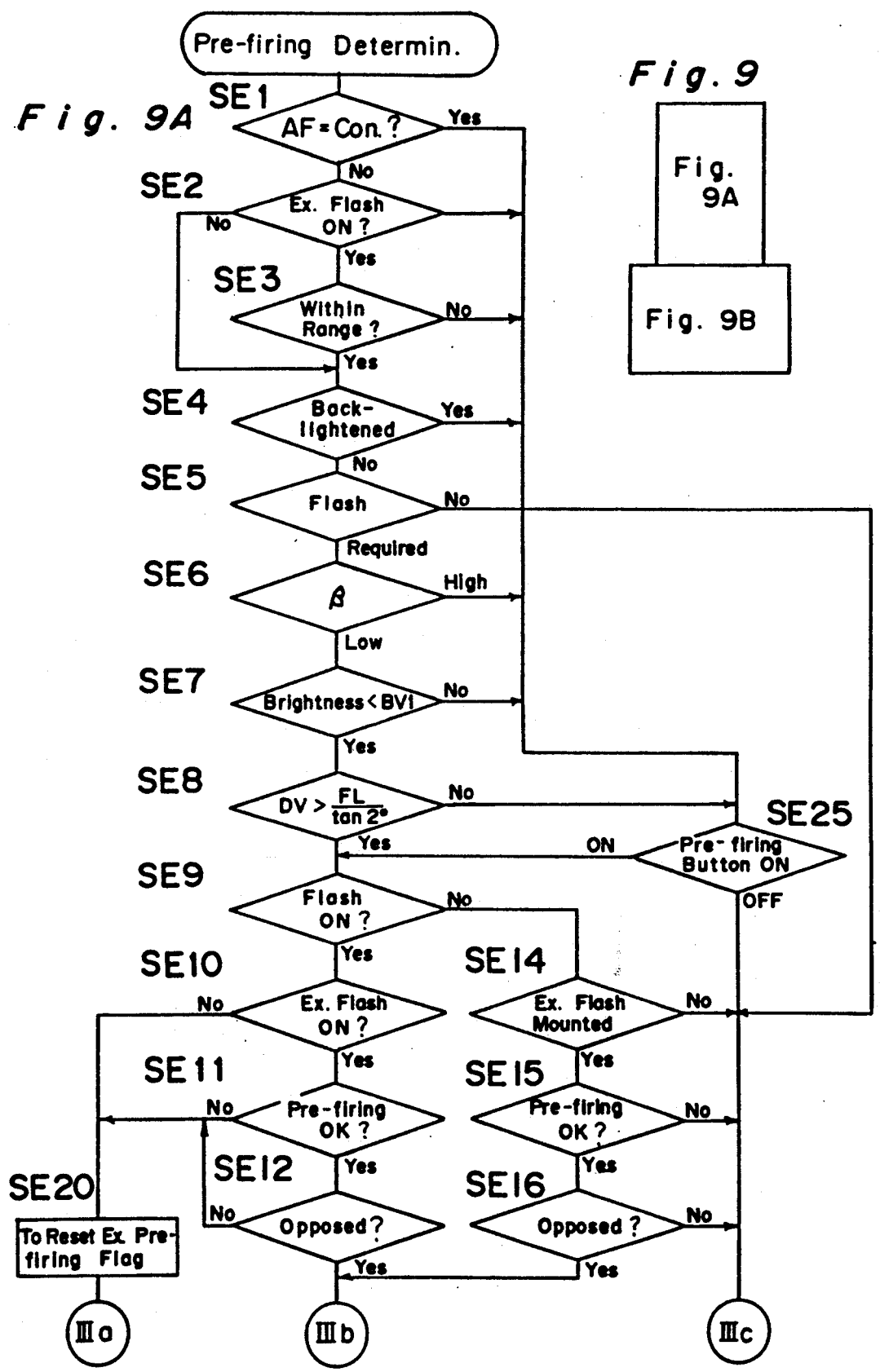

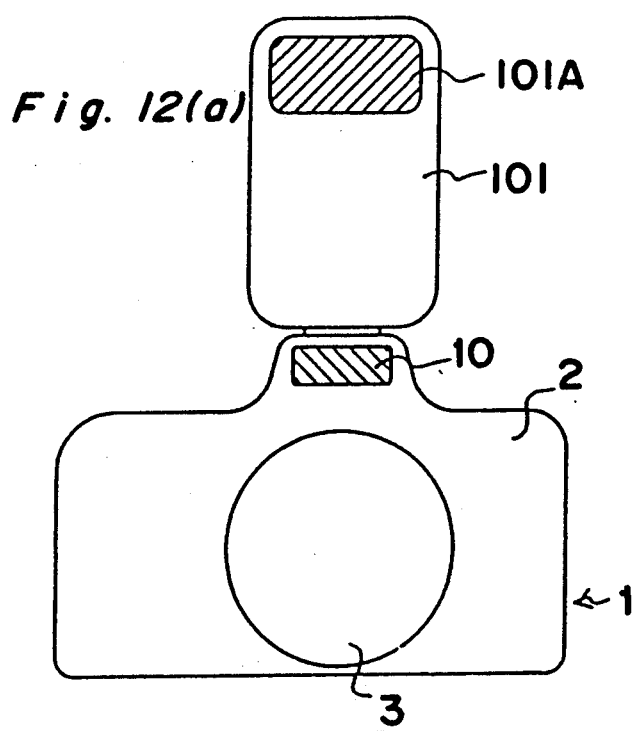
Fig. 12(a)
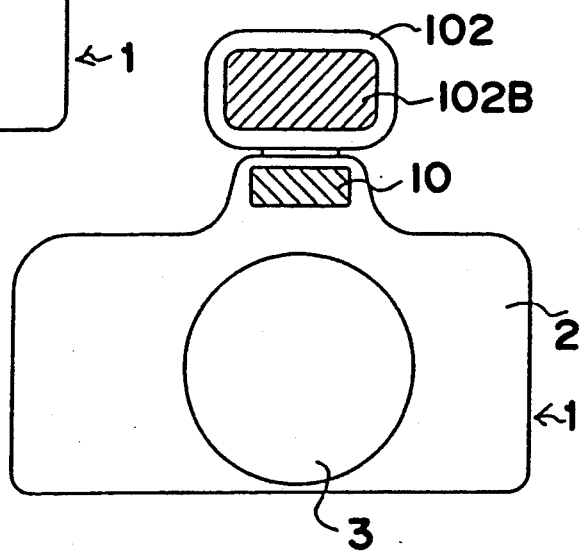
Fig. 12(b)
Fig. 14
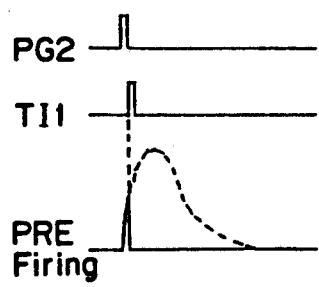
Fig. 15
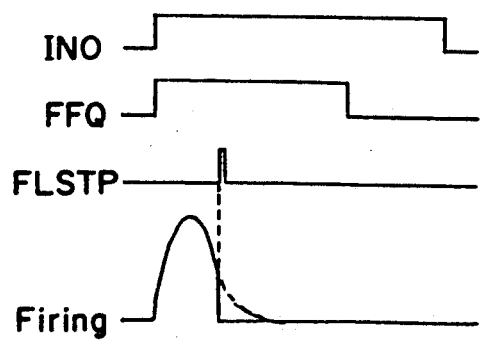

PHOTOGRAPHIC CAMERA WITH FLASH UNIT

BACKGROUND OF THE INVENTION

1. Field of the Invention

The present invention generally relates to a photographic camera and, more particularly, to a photographic camera equipped with an electric flash unit.

2. Description of the Prior Art

As is well known, in color photographs when a photo-taking is carried out with a flash unit fired direct towards a target object to be photographed, it often occurs that the resultant photo of the target object shows the presence of a red-eye phenomenon, the phenomenon in which the eyes of the target object photographically exposed on a film is colored in red. This red-eye phenomenon appears to have resulted from the situation in which flash light fired from a flash unit, after having entered into the eyeballs and subsequently reflected from the retinas, reaches a light sensitive film in a camera through the pupils of the target object.

In order to avoid the possible occurrence of the red-eye phenomenon, the prior art method such as disclosed in, for example, the Japanese Patent Publication No. 58-48088 published in 1983, is that the target object is preliminarily illuminated by a beam of light to cause the pupils to be closed prior to the actual photo-taking and the image of the target object is subsequently exposed on the light sensitive film.

However, it is well recognized that the possibility of occurrence of the red-eye phenomenon depends on various photo-taking conditions including, for example, the brightness of the surroundings of the target object, the camera-to-object distance, the distance from a photo-taking lens assembly of the camera and a flash firing window of the flash unit used, etc. Accordingly, where the beam of light is emitted for the purpose of avoiding the possible occurrence of the red-eye phenomenon according to the prior art method even in the case where the possibility of occurrence of the red-eye phenomenon is relatively small, the result would be a waste of the electric power.

Also, it is not easy for a photographer to take a countermeasure to avoid the possible occurrence of the red-eye phenomenon in anticipation of the possibility of occurrence of the red-eye phenomenon.

SUMMARY OF THE INVENTION

Accordingly, the present invention has been devised with a view to substantially eliminating the above discussed problems and has for its essential object to provide an improved photographic camera wherein, only when a countermeasure against the possible occurrence of the red-eye phenomenon is required, such countermeasure can be taken to avoid the red-eye phenomenon appearing on the photographic print thereby to avoid a waste of the electric power.

In order to accomplish the object of the present invention, there is provided an improved photographic camera which comprises a flash firing means for firing a flash light for illuminating a target object to be photographed when an image of the target object is desired to be exposed on a light sensitive film; a preliminarily flash firing means activated prior to the flash light fired by the flash firing means to emit a preliminary flash light necessary to cause the pupils of the target object to close; a manipulating means for selecting a mode in which the preliminarily flash firing means is activated; a determining means for determining the necessity of the preliminary flash light under a predetermined condition; and a display means for providing, on the basis of a result of determination made by the determining means, an indication that the preliminary flash light is necessary.

According the the present invention, the photographic camera can determine automatically whether or not the preliminary flash light is required. The actual preliminary flash firing from the preliminarily flash firing means can be accomplished when the photographer manipulates the preliminarily flash firing means.

BRIEF DESCRIPTION OF THE DRAWINGS

This and other objects and features of the present invention will become clear from the following description thereof taken in conjunction with preferred embodiments thereof with reference to the accompanying drawings, in which FIGS. 1 to 11 illustrate an embodiment of a photographic camera according to the present invention, while FIGS. 12 to 19 illustrate an embodiment of an extra flash unit according to the present invention, wherein:

FIGS. 1 and 2 are schematic perspective views of the photographic camera as viewed from different angles, respectively;

FIG. 3 is a block diagram showing an electric circuit used in the camera;

FIGS. 5 to 11 are flowcharts showing the sequence of operation of a microcomputer CCPU;

FIGS. 12(a) and 12(b) are schematic front elevational views of different types of extra flash units mounted on the camera;

FIG. 13 is a block diagram showing an electric circuit used in the extra flash unit;

FIGS. 14 and 15 are timing charts showing an operation of the electric circuit shown in FIG. 13;

FIGS. 16 to 19 are flowcharts showing the sequence of operation of a flash microcomputer FCPU used in the extra flash unit;

DETAILED DESCRIPTION OF THE EMBODIMENTS

Figure 1:
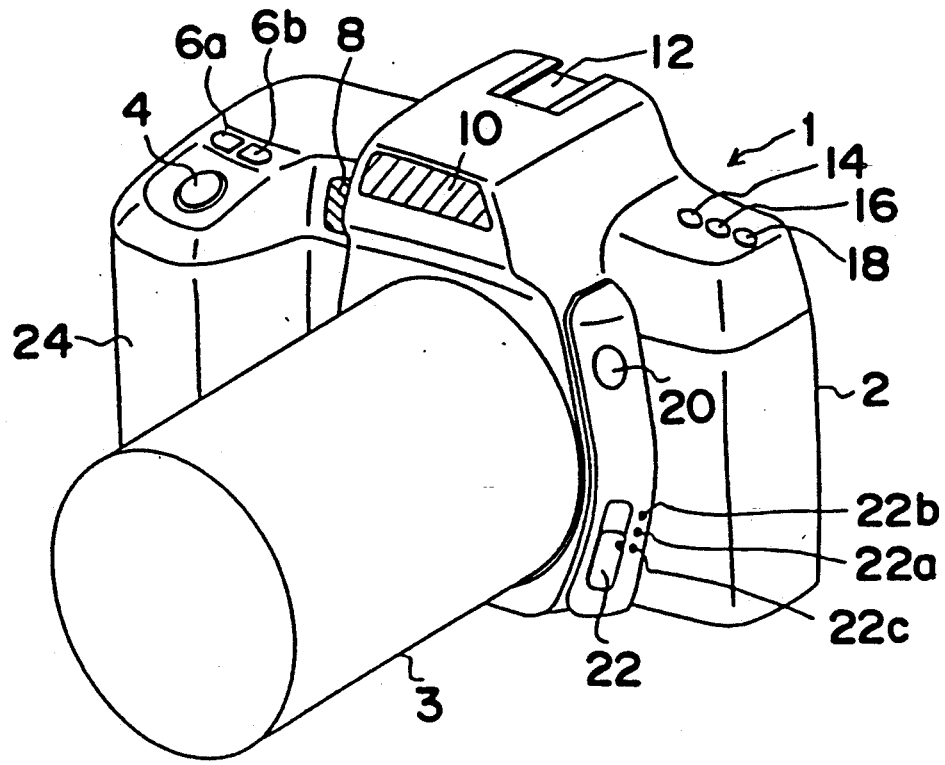
Figure 2:
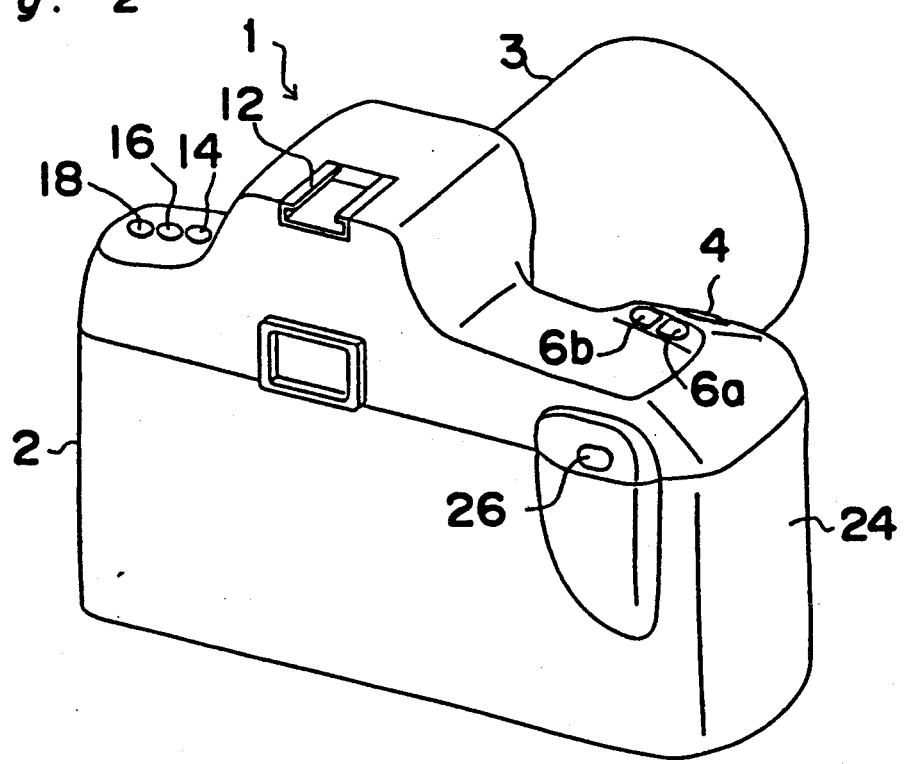

Referring first to FIGS. 1 and 2 which illustrate a single lens reflex camera as viewed from front and rear, respectively, to which the present invention is applicable, the illustrated camera 1 comprises a camera body 2 and an interchangeable photo-taking lens assembly 3 coupled interchangeably with the camera body 2. The camera body 2 includes a shutter release button 4, up-shift and down-shift buttons 6a and 6b, an auxiliary lighting window 8 from which auxiliary beams of light for use during an automatic focusing (AF) procedure emerge, a flash window 10 from which a flash of light generated by a built-in flash unit emerges, an accessary shoe 12 for the removable support thereon of an extra flash unit, a flash firing mode selector button 14, an exposure control mode selector button 16, a drive mode selector button 18 and an aperture setting button 20, all being disposed at an upper portion of the camera body 2. The camera body 2 also includes an AF mode selector button 22 disposed at a location laterally of a lens mounting opening defined at the front of the camera body 2, said AF mode selector button 22 being slidable to any one of a one-shot AF mode position 22a at which a single automatic focusing (AF) operation takes place in response to a manipulation of the shutter release button 4 until an image of a target object to be photographed can be brought into an in-focus position, a continuous AF mode position 22b at which the AF operation is resumed when the target object once brought into the in-focus position is defocused and a manual focusing mode position 22c at which an automatic focusing is disabled to interrupt a lens drive. On one side of the camera body 2 where a grip 24 is provided, the camera body 2 has a pre-firing (preliminary firing) button 26 mounted at a rear top portion thereof.

Figure 3:
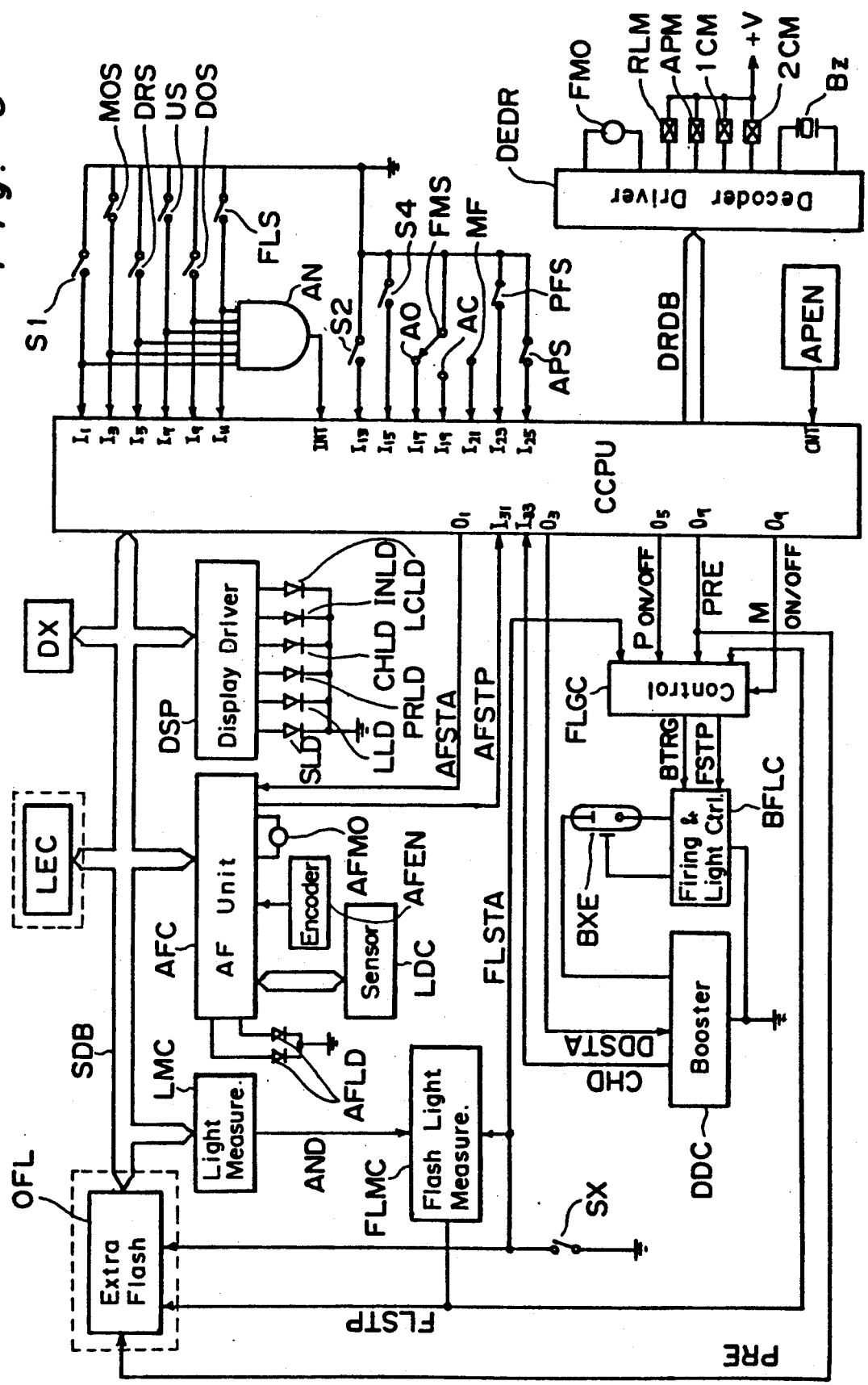

The camera system as a whole has an electric circuit such as shown in FIG. 3. In FIG. 3, reference character CCPU represents a main microcomputer used to control the sequence of operation of the camera system and also to calculate exposure parameters for the camera system. Reference character AFC represents an AF unit comprising a lens drive unit and a microcomputer dedicated to the distance measurement and calculation. Reference character LDC represents a distance measuring sensor adapted to be controlled by the AF unit AFC. Reference character AFEN represents an encoder unit for controlling the lens drive, which is operable to detect the amount of drive of the lens assembly and to transmit it to the AF unit AFC. Reference character AFMO represents a drive motor for driving the lens assembly, and reference character AFLD represents a pair of light emitting diodes for emitting the auxiliary beams of light which emerges outwardly from the auxiliary lighting window 8 for illuminating the target object to facilitate a distance measurement.

Reference character LEC represents a lens circuit having a memory unit for storing lens data peculiar to the lens assembly, which is connected with the main microcomputer CCPU through a serial data bus SDB. Reference character DX represents a film speed reader for reading the ISO sensitivity of a film used and transmitting it to the main microcomputer CCPU.

Reference character DSP represents a display driver for driving light emitting diodes on the basis of data supplied from the main microcomputer CCPU. Reference characters LLD, PRLD, CHLD, INLD and LCLD represent respective display light emitting diodes, the details of each of which will be described later with particular reference to FIG. 4. Reference character SLD represents a display light emitting diode for indicating that a self-timer built in the camera body 2 is being operated, a lighting condition of said light emitting diode SLD being viewable from outside through the auxiliary lighting window 8.

Reference character LMC represents a light measuring circuit for measuring the brightness of the target object under a natural lighting condition and for transmitting the brightness information to the main microcomputer CCPU. Although in practice the brightness information is comprised of a plurality of data obtained by means of a multi-divided silico-photo-cell SPC, they are well known in the art and, therefore, the details thereof are not herein discussed for the sake of brevity.

Reference character FLMC represents a flash light measuring circuit operable to determine and control the amount of flash light to be emitted in accordance with the film speed information supplied from the film speed reader DX. Reference character DEDR represents a decoder driver for decoding data supplied from the main microcomputer CCPU through a data bus DRDB and for driving various actuators as will be described later.

Reference character FMO represents a drive motor for charging mechanisms for a reflex mirror, etc., and for winding a film loaded in the camera body 2. Reference character RLM represents a magnet for initiating a release operation. Reference character APM represents an aperture control magnet for controlling the aperture. Reference characters 1CM and 2CM represent respective shutter control magnets for controlling first and second shutter curtains, respectively. Reference character BZ represents a buzzer.

Reference character APEN represents a aperture control encoder operable to transmit to the main microcomputer pulses corresponding to the amount of the aperture stopped down.

Reference character S1 represents a light measurement switch adapted to be closed upon a first stage depression of the shutter release button 4. Reference character MOS represents an exposure control mode selector switch adapted to be closed in response to a manipulation of the exposure control mode selector button 16 for cyclically changing over to a programmed automatic exposure control mode (hereinafter referred to as P mode), an aperture-priority automatic exposure control mode (hereinafter referred to as A mode), a manual exposure control mode (hereinafter referred to as M mode) and a shutter-priority automatic exposure control mode (hereinafter referred to as S mode) and then back to P mode in the specified order each time the exposure mode control selector switch MOS is closed. Reference character DRS represents a drive mode selector switch adapted to be closed in response to a manipulation of the drive mode selector button 18 for cyclically changing over to a Single Shot position, a Continuous Shot position and a Self-timer position and then back to the Single Shot position each time the drive mode selector switch DRS is closed. Reference characters US and DOS represent up-shift and down-shift switches adapted to be closed in response to a manipulation of the up-shift and down-shift buttons 6a and 6b, respectively, for changing a preset aperture value or a preset shutter speed. Reference character FLS represents a switch used to selectively switch the built-in flash unit on and off or bring it in AUTO and OFF positions and adapted to be closed in response to a manipulation of the flash firing mode selector button 14. The above described six switches are connected to respective input terminals of an AND gate AN having its output terminal connected with an interruption terminal of the main microcomputer CCPU.

Reference character S2 represents a release shutter switch adapted to be closed upon a second stage depression of the shutter release button 4. Reference character S4 represents a switch adapted to be closed upon completion of travel of the second shutter curtain and opened upon completion of the film winding. Reference character FMS represents a focusing mode switch having three switching positions AO, AC and MF, which switch FMS is capable of assuming one of the One-shot AF position AO, Continuous AF position AC and Manual Focusing position MF depending on the position of the AF mode selector button 22. Reference character PFS represents a pre-firing mode selector switch adapted to be closed so as to establish a pre-firing mode so long as the pre-firing button 26 is depressed. Reference character APS represents an aperture setting switch operatively associated with the aperture setting button 20 for changing the preset aperture value when either the up-shift button 6a or the down-shift button 6b is depressed while the aperture setting button 20 is depressed, that is, when either the up-shift button 6a or the down-shift button 6b is closed during the closure of the aperture setting switch APS and for changing the preset shutter speed when either the up-shift button 6a or the down-shift button 6b is switched on during the opening of the switch APS.

Reference character DDC represents a voltage boosting circuit for the built-in flash unit. Reference character BXE represents a xenon tube installed internally of the camera body behind the flash window 10. Reference character BFLC represents a firing and lighting control circuit for the built-in flash unit. Reference character FLGC represents a control circuit for the built-in flash circuit and the boosting circuit, which is operable to control the built-in flash unit in dependence on a signal supplied from the main microcomputer CCPU. Reference character Sx represents a synchro switch adapted to be closed in response to completion of travel of the first shutter curtain to define the timing at which a flash firing is to be effected. Reference character OFL represents the extra flash unit.

Figure 4A:
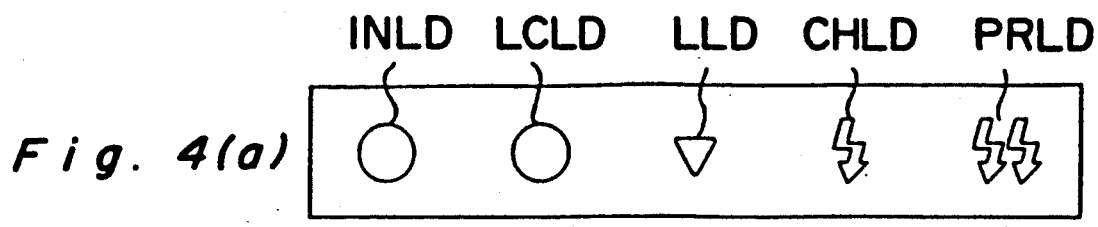
FIGS. 4(a) to 4(f) are diagrams showing respective manners of display.
Figure 4B:
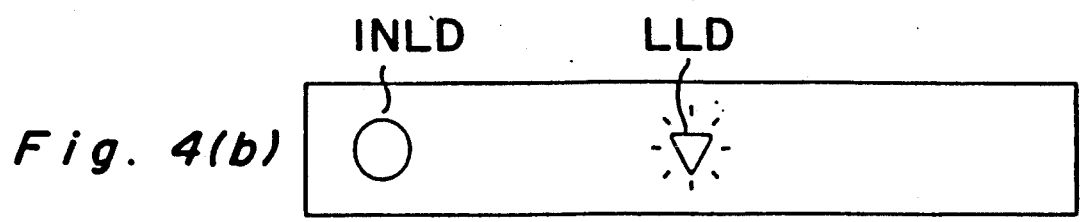
Figure 4C:
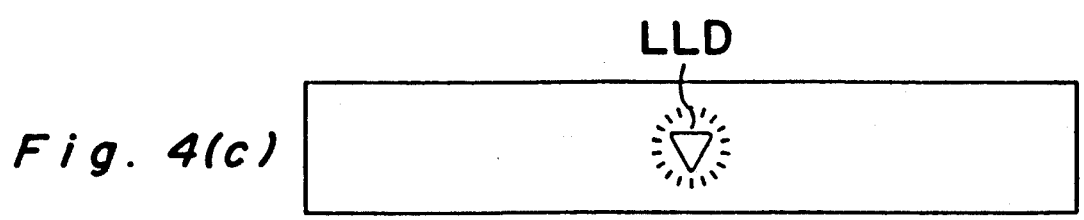

FIG. 4(a) illustrates an arrangement of all of the light emitting diodes forming a display unit viewable within the viewfinder of the camera body 2. These light emitting diodes include a green in-focus marking INLD adapted to be lit when the target object is brought into the in-focus condition as a result of the AF operation; a red out-of-focus marking LCLD adapted to be lit during the AF operation taking place or during the AF incapability; a red charge marking LLD adapted to blink when the flash firing is required while no flash firing mode is selected and to be lit when a main capacitor for the flash unit is being charged; a flash marking CHLD adapted to be lit when consequent upon completion of the charging of the main capacitor to a predetermined level the flash firing is ready; and a pre-firing marking PRLD adapted to blink when the pre-firing is required and to be lit when the pre-firing mode has been selected.

Figure 4D:
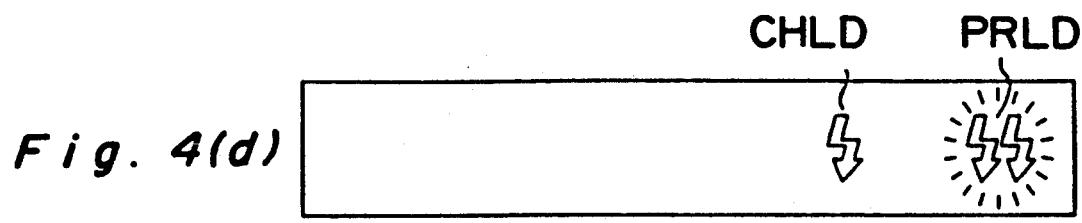
Figure 4E:
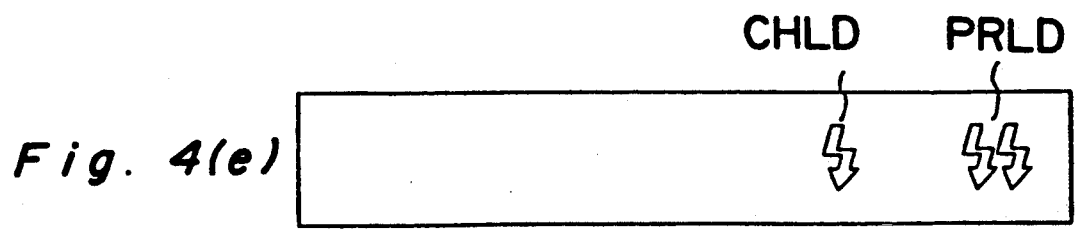
Figure 4F:
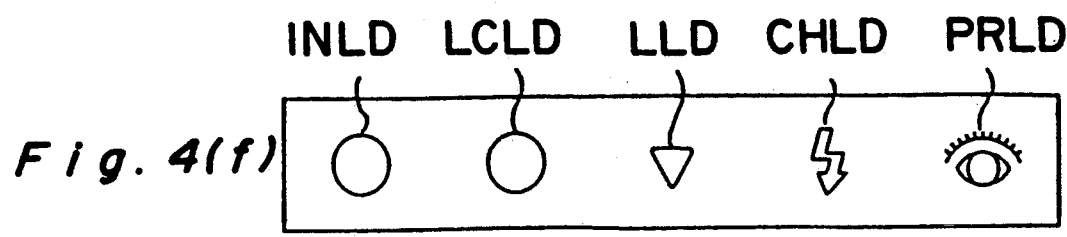

FIG. 4(f) illustrates a modified form of the display unit of FIG. 4(a), wherein the pre-firing marking PRLD is employed in the form of an eye and is adapted to be lit in red color when the pre-firing is required, but in green color when the pre-firing mode is selected.

Figure 5:
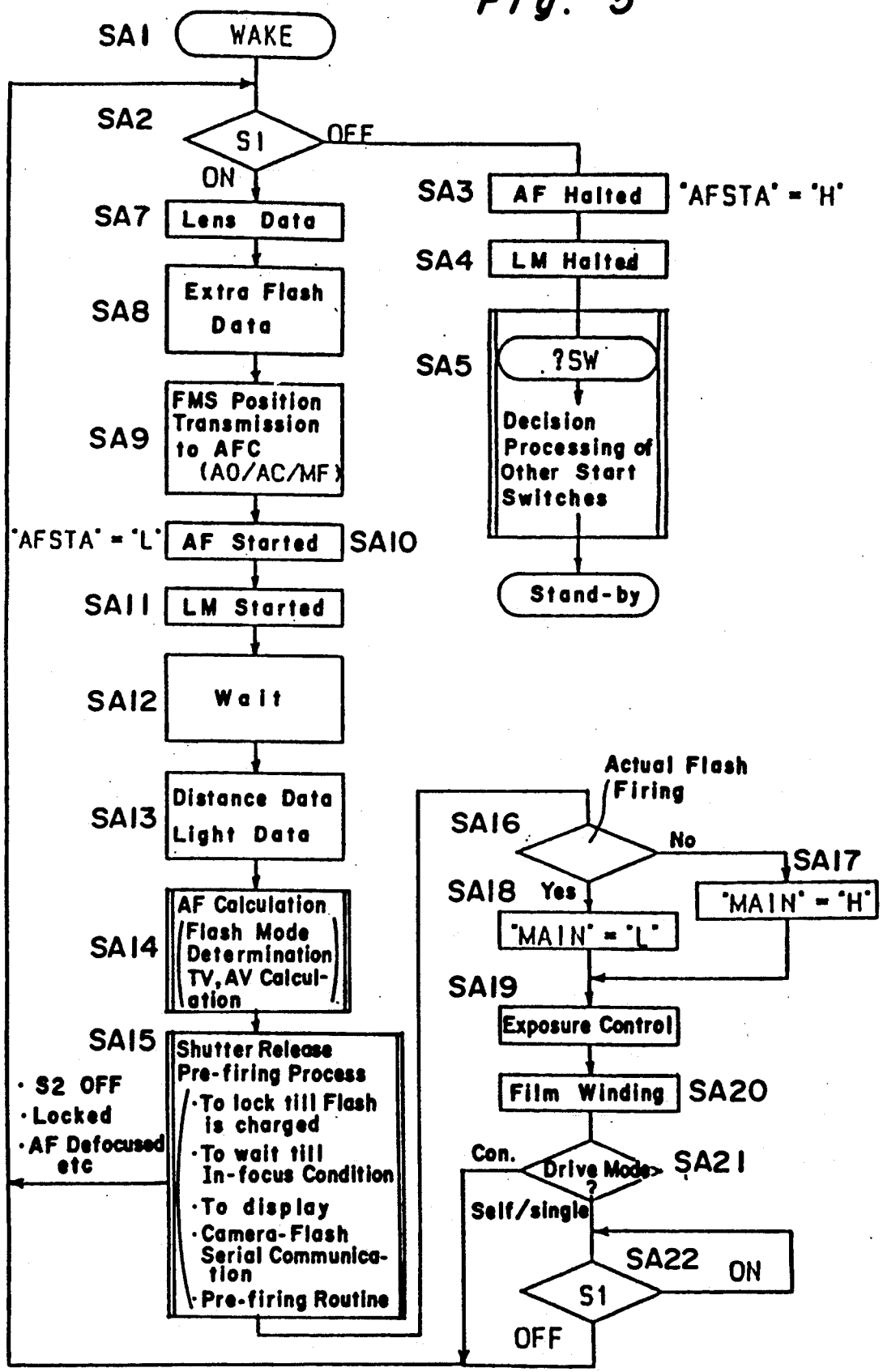

FIG. 5 illustrates a schematic flowchart showing the sequence of operation of the main microcomputer CCPU according to the preferred embodiment of the present invention, reference to which will now be made.

When at least one of the six starter switches S1, MOS, DRS, US, DOS and FLS is closed, the AND gate AN outputs a low level signal which is in turn inputted to an INT terminal of the main microcomputer CCPU to bring the INT terminal into a low level state. The INT terminal is an interruption terminal and, therefore, the main microcomputer CCPU is interrupted in response to a raising edge from a high level state to a low level state of the signal applied to the INT terminal, thereby allowing the main microcomputer CCPU to start from a stand-by state to execute a WAKE routine, shown in FIG. 5, at step SA1.

Then, at subsequent step SA2, a decision is made to determine if the switch S1 is closed at an input port $I_1$. If the result of decision indicates the opening of the switch S1, the program flow proceeds to step SA3 at which an output port $O_1$ (AFSTA) is rendered in a high level state for stopping the distance measurement and the lens drive. In response to a raising edge from a low level state to the high level state of AFSTA, the AF unit AFC ceases its operation, followed by the transmission of a LM (light measurement) halting data through the serial data bus SDB to the light measuring circuit LMC so that at step SA4 the light measurement can cease.

Then, at step SA5, in reference to input ports $I_3$, $I_5$, $I_7$, $I_9$ and $I_{11}$ a decision is made to determine if any one of the switches other than the switch S1 are closed. Should the result of decision at step SA5 indicate the closure of any one of the switches other than the switch S1, a process associated therewith is carried out. The decision of the respective states of these starter switches and their associated processes will be discussed later with reference to FIG. 6. Should none of the starter switches be closed, or subsequent to the processing at step SA5, the program flow proceeds to step SA6 at which the main microcomputer CCPU is held in the stand-by state.

On the other hand, where the result of decision at step SA2 indicates the closure of the switch S1, the program flow proceeds to step SA7 at which lens data are inputted from the lens circuit LEC through the serial data bus SDB, followed by the inputting of data of the extra flash unit through the serial data bus SDB at step SA8.

Then, at step SA9, the position of the focusing mode switch FMS is detected in reference to input ports $I_{17}$, $I_{19}$ and $I_{21}$ to determine which one of the one-shot AF, the continuous AF and the manual focusing mode has been set to. These focus adjusting mode information, the lens data and the extra flash data including the presence or absence of the extra flash unit are transmitted to the AF unit AFC.

At step SA10, an output port $O_1$ (AFSTA) is rendered in a low level state to apply a start signal to the AF unit AFC. The AF unit AFC starts a distance measurement, a distance calculation and a lens drive in response to a change from a high level state to a low level state of AFSTA. At subsequent step SA11, the light measurement is started in response to the transmission of the LM starting data through the serial data bus SDB to the light measuring circuit LMC.

Unless even the single light measurement and the single distance measurement have been yet completed, a wait is made at step SA12 until measured light data and measured distance data are made available. These can be determined in reference to the length of time elapsed from the start of the distance measurement at step SA10 and that of the light measurement at step SA11.

Where the preparation of the measured light data and the measured distance data has been completed, these measured light and distance data are inputted from the light measuring circuit LMC and the AF unit AFC, respectively, through the serial data bus SDB at step SA13. Since the AF unit AFC has already acquired lens position information from the encoder unit AFEN, the main microcomputer CCPU can obtain information on the distance to the target object to be photographed.

At step SA14 following step SA13, an automatic exposure (AE) calculation is carried out. This AE calculation is to calculate the aperture value (AV) and the shutter speed (TV) both for the control on the basis of the lens data, the measured brightness data and the information concerning the operation state of the flash unit all made available, the detail of such calculation being described subsequently with particular reference to FIG. 7.

The program flow then proceeds to step SA15 at which various decisions are made to determine whether or not the flash unit has been charged, to determine whether or not the AF operation (the lens drive) has been completed and then to determine whether or not the shutter release is to be started. Where the result of decision indicates that the shutter release should not be effected, the program flow returns to step SA2 to repeat the program flow from step SA2 to step SA15 so long as the switch S1 is closed. Since step SA15 includes a display control, a data transmission from the camera to the extra flash unit and a pre-firing routine and is a routine which forms the outline of the present invention, the details thereof will be described later with particular reference to FIGS. 8 to 11.

On the other hand, where the result of decision at step SA15 indicates that the shutter release should be effected, the program flow proceeds to step SA16 subsequent to the execution of processes necessary to effect the display and the pre-firing. At step SA16, a decision is made to determine the necessity of the actual firing of the flash unit. Where a flash non-firing mode is chosen at the AE calculating step SA14, the program flow proceeds to step SA17 at which an output port O9 (MAIN) is rendered in a high level state, thereby to cause the control circuit FLGC to inhibit the actual firing of the built-in flash unit. On the other hand, where the flash firing mode is chosen, the output port O9 (MAIN) is rendered in a low level state at step SA18 thereby to enable the actual flash firing of the built-in flash unit.

Thereafter, the exposure control takes place at step SA19. This exposure control includes the initiation of the shutter release as a result of the energization of the magnet RLM, the aperture control by the magnet APM, the shutter speed control by the shutter control magnets 1CM and 2CM, etc., all of which are well known to those skilled in the art and are therefore not discussed herein for the sake of brevity. However, to describe the control associated with the flash units, the deenergization of the shutter speed control magnet 1CM results in the start of travel of the first shutter curtain and the synchro switch Sx is closed upon completion of the travel of the first shutter curtain so that FLSTA can be brought into a low level state from the high level state to allow a trigger signal for flash firing to be inputted to the extra flash unit OFL and the built-in flash unit FLGC. It is, however, to be noted that the firing is, so far as the extra flash unit is concerned, determined in dependence on firing enabling/disabling data supplied from the main microcomputer CCPU through the serial data bus SDB beforehand and is, so far as the built-in flash unit is concerned, determined in dependence on the previously described MAIN signal.

The control circuit FLGC outputs the trigger signal BTRG necessary to fire the built-in flash unit to the firing and lighting control circuit BFLC in synchronism with FLSTA to initiate the firing of the built-in flash unit only when the signal MAIN is in a low level state. Also, in response to a change from the high level state to the low level state of FLSTA, the flash light measuring circuit FLMC starts its light measurement for controlling the amount of flash light. When the amount of flash light attains a proper level appropriate to the film sensitivity consequent upon this light measurement, the flash light measuring circuit FLMC supplies a flash firing stop signal FLSTP to the extra flash unit OFL and the control circuit FLGC. The control circuit FLGC outputs a flash firing stop signal FSTP for interrupting the firing of the built-in flash unit to the firing and lighting control circuit BFLC in synchronism with the flash firing stop signal FLSTP to interrupt the flash firing only when the previously described signal MAIN is in the low level state.

At step SA19, the position of the switch S4 is detected in reference to an input port I15 and a wait is made until the input port I15 is rendered in a low level state so that the film winding can be enabled subsequent to the completion of travel of the second shutter curtain.

Then, at step SA20, the film winding takes place. Even at this step the position of the switch S4 is detected and a wait is made until the completion of the film winding, that is, until the switch S4 is brought to a high level state.

Thereafter, at step SA21, a decision is made to determine the drive mode. In the case of the continuous shooting, the program flow returns to step SA2 to repeat the previously discussed routine. On the other hand, in the case of the single shooting or the self-timer, the program flow proceeds to the next succeeding step SA22 at which a decision is made to determine the position of the switch S1. Should the switch S1 be closed, a wait is made until it is turned off. On the other hand, where the switch S1 is opened, the program flow returns to step SA2 at which the position of the switch S1 is again determined so that the program flow can proceeds to step SA3 when the result of decision at step SA2 indicates that the switch S1 is opened, as hereinbefore described to eventually bring the main microcomputer CCPU to the stand-by state as step SA6.

The previously mentioned decision and processing routine for the starter switches will now be described with reference to FIG. 6.

Figure 6A:
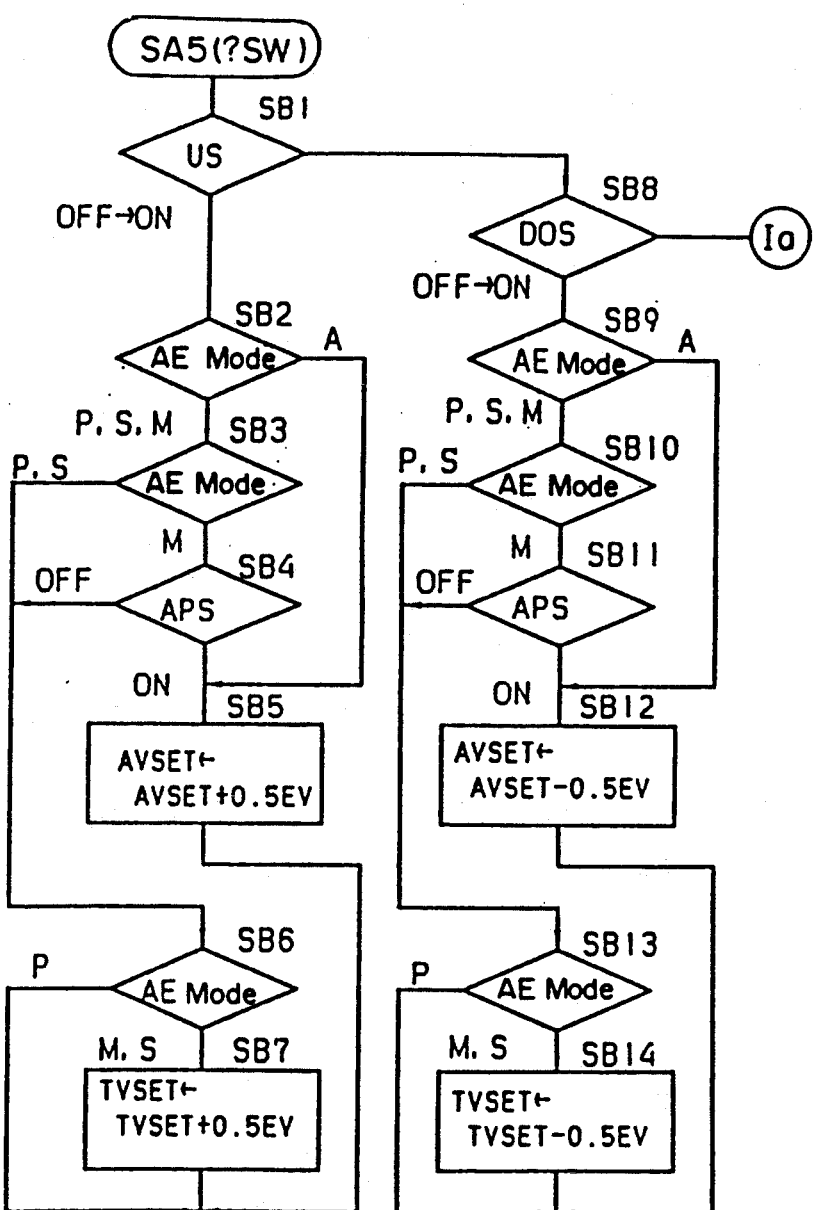
Figure 6:
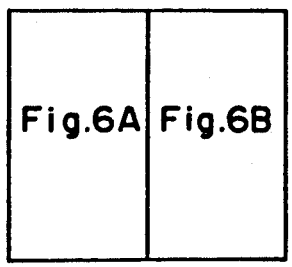
Figure 6B:
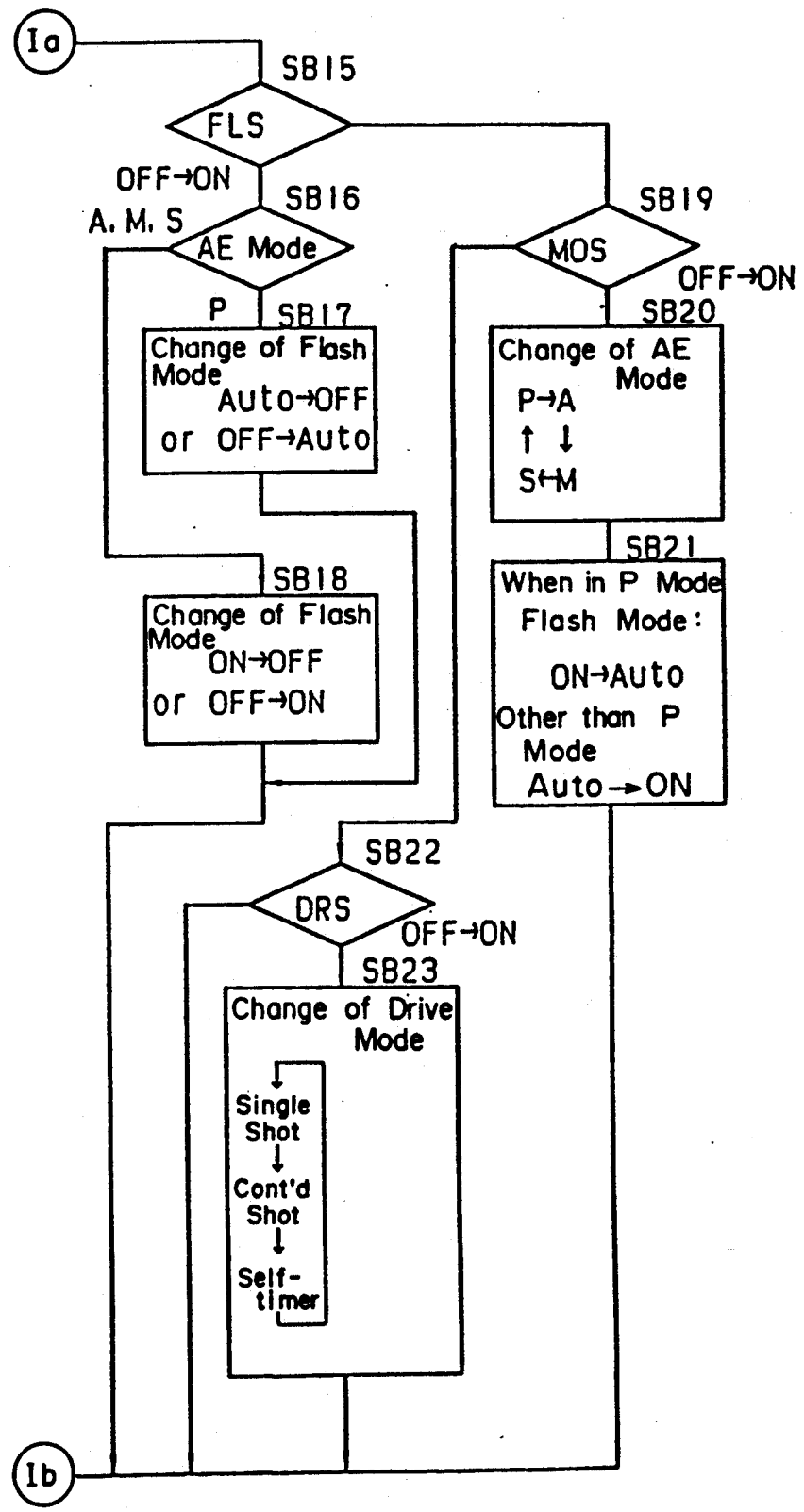

The program step SA5 shown in FIG. 5 is followed by a decision step SB1 for the determination of the position of the up-shift switch US as shown in FIG. 6.

Where the result of decision at step SB1 indicates that the position of the up-shift switch US has changed from an OFF position to an ON position, the program flow proceeds to step SB2, but where it indicates that the up-shift switch US remains in the OFF or ON position or the position of the up-shift switch US has changed from the ON position of the OFF position, the program flow proceeds to step SB8.

At step SB2, the exposure control mode selected by the exposure control mode selector switch MOS is determined. Where A mode is selected, the program flow proceeds to step SB5 at which the preset aperture value AVSET is incremented by 0.5 EV.

On the other hand, where the A mode is not selected as determined at step SB2, the program flow proceeds to step SB3 at which the exposure control mode is again determined. Should the result of decision at step SB3 indicate that M mode has been selected, the program flow proceeds to step SB4 at which a decision is made to determine if the aperture setting switch APS is closed. In the event that the aperture setting switch APS is closed as determined at step SB4, the aperture value AVSET is incremented by 0.5 EV at step SB5.

Where the result of decision at step SB3 indicates that the M mode is not selected, or where the result of decision at step SB4 indicates that the aperture setting switch APS is opened, step SB6 takes place to determine the exposure control mode again. In the event that the result of decision at step SB6 indicates that the M mode or S mode has been selected, the program flow proceeds to step SB7 at which the preset shutter speed value TVSET is incremented by 0.5 EV.

On the other hand, where the result of decision at step SB6 indicates that P mode has been selected, the program flow skips step SB7 to terminate the program step of SA5 in a manner similar to the execution of step SB5 or SB7, with the program flow returning to step SA6.

The foregoing program flow through step SB2 is executed for the purpose of admitting that the up-shift switch US has been closed, wherein when the M mode is selected with the aperture setting switch APS being closed or when the A mode is selected, the preset aperture value AVSET can be incremented by 0.5 EV, while when the M mode is selected with the aperture setting switch APS being opened or when the S mode is selected, the preset shutter speed value TVSET can be incremented by 0.5 EV, however, no change occurring during the P mode.

Where the result of decision at step SB1 indicates that the up-shift switch US has not changed from the OFF position to the ON position, the program flow proceeds to step SB8 at which a decision is made to determine the position of the down-shift switch DOS. Should the down-shift switch DOS have changed from an OFF position to an ON position, step SB9 takes place, or otherwise the program flow proceeds to step SB15.

At step SB9, the exposure control mode is determined and, if the A mode is selected, step SB12 takes place at which the preset aperture value AVSET is decremented by 0.5 EV.

On the other hand, if the result of decision at step SB9 indicates that the A mode is not selected, step SB10 takes place at which the exposure control mode is again determined. If the result of decision at step SB10 indicates that the M mode is selected, step SB11 takes place at which the position of the aperture setting switch APS is determined. Should the aperture setting switch APS be found closed, the preset aperture value AVSET is decremented by 0.5 EV at step SB12. On the other hand, should the result of decision at step SB10 indicate that the M mode is not selected, or should the result of decision at step SB11 indicate that the aperture setting switch APS is opened, the exposure control mode is again determined at step SB13. If the result of decision at step SB13 indicates that the M mode or the S mode is selected, the preset shutter speed value TVSET is decremented by 0.5 EV at step SB14.

Where the result of decision at step SB13 indicates the selection of the P mode, the program flow skips step SB14 to terminate the process at step SA5 and then to resume step SA6 in a manner similar to that subsequent to step SB14.

The foregoing program flow through step SB9 is executed for the purpose of admitting that the down-shift switch DOS has been closed, wherein, when the M mode is selected with the aperture setting switch APS being closed during the M mode, or when the A mode is selected, the preset aperture value AVSET can be decremented by 0.5 EV; when the M mode is selected with the aperture setting switch APS being opened, or when the S mode is selected, the preset shutter speed value TVSET can be decremented by 0.5 EV; and no change occur during the P mode.

Also, where the result of decision at step SB8 indicates that the down-shift switch DOS has not changed from an OFF position to an ON position, step SB15 takes place to determine the position of the switch FLS. Should the result of decision at step SB15 indicates a change of the switch FLS from an OFF position to an ON position, the program flow proceeds to step SB16, or otherwise step SB19 takes place.

At step SB16, a decision is made to determine the exposure control mode and, if the P mode is selected as determined at step SB16, step SB17 takes place to change the firing mode of the built-in flash unit. In other words, if an automatic firing mode (Auto mode) has been selected, it is changed to a flash inhibiting mode (OFF) and, conversely, if the OFF mode has been selected, it is changed to the automatic firing mode (Auto).

On the other hand, should the result of decision at step SB16 indicate that the P mode is not selected, the program flow proceeds to step SB18 at which the firing mode of the built-in flash unit is changed in a manner similar to that occurring at step SB17. However, since the automatic firing mode has been designed to take place only during the P mode, the built-in flash unit if selected OFF mode is rendered in a forced firing mode (ON), but the built-in flash unit if selected On mode is set in the flash inhibiting mode (OFF).

As hereinabove described, if step SB17 or step SB18 is executed, the firing mode of the built-in flash unit is changed, followed by the termination of the process at step SA5 to allow the program flow to resume the next succeeding step SA6.

Where the result of decision at step SB15 indicates that the switch FLS has not changed from an OFF position to an ON position, step SB19 takes place to determine the position of the exposure control mode selector switch MOS. Should the result of decision at step SB19 indicates a change of the exposure control mode selector switch MOS from an OFF position to an ON position, step SB20 takes place, or otherwise step SB22 takes place.

At step SB20, the exposure control mode is changed. In other words, if the P mode has been selected, the exposure control mode is changed onto the A mode; if the A mode has been selected, the exposure control mode is changed onto the M mode; if the M mode has been selected, the exposure control mode is changed to the S mode; and if the S mode has been selected, the exposure control mode is changed to the P mode.

Then, at step SB21, the firing mode of the built-in flash unit is corrected. In other words, since the automatic firing mode, that is, the Auto mode, is available only during the P mode, where the exposure control mode is changed to the P mode and, at the same time, the firing mode of the built-in flash unit is set in the forced firing mode (ON), the firing mode of the built-in flash unit is set in the Auto mode. On the other hand, where the exposure control mode is changed to the mode other than the P mode and, at the same time, the firing mode of the built-in flash unit is set in the Auto mode, the firing mode of the built-in flash unit is set in the forced firing mode (ON). After the execution of the program step SB21, the process at step SA5 is terminated, allowing the program flow to proceed to step SA6.

Where the result of decision at step SB19 indicates that the exposure control mode selector switch MOS has not changed from the OFF position to the ON position, step SB22 takes place to determine the position of the drive mode selector switch DRS. In the event that the result of decision at step SB22 indicates a change of the drive mode selector switch from an OFF position to an ON position, step SB23 takes place to change the drive mode. In other words, if the single shot is selected, the drive mode is changed to the continuous shot; if the continuous shot is selected, the drive mode is changed to the self-timer; and if the self-timer is selected, the drive mode is changed to the single shot.

After the execution of step SB23, or if the result of decision at step SB22 indicates a change of the drive mode selector switch DRS from the OFF position to the ON position, the process at step SA5 is terminated, followed by step SA6.

The foregoing is the description of the routines for the determination of the respective positions of the starter switches and their associated processes, wherein the preset aperture value AVSET, the preset shutter speed value TVSET, the firing mode of the built-in flash unit, the exposure control mode and the drive mode are adjusted.

It is to be noted that the firing mode of the extra flash unit has no concern with the position of the switch FLS installed in the camera body 2 and is selected according to a selector switch (not shown) built in the extra flash unit. However, even in the extra flash unit, an adjustment similar to that described in connection with the firing mode of the built-in flash unit may take place. In other words, the camera system can transmit the exposure control mode to the extra flash unit so that a similar processing takes place in the extra flash unit to permit the latter to be operated in the Auto mode only during the P mode selected in the camera system.

Figure 7:
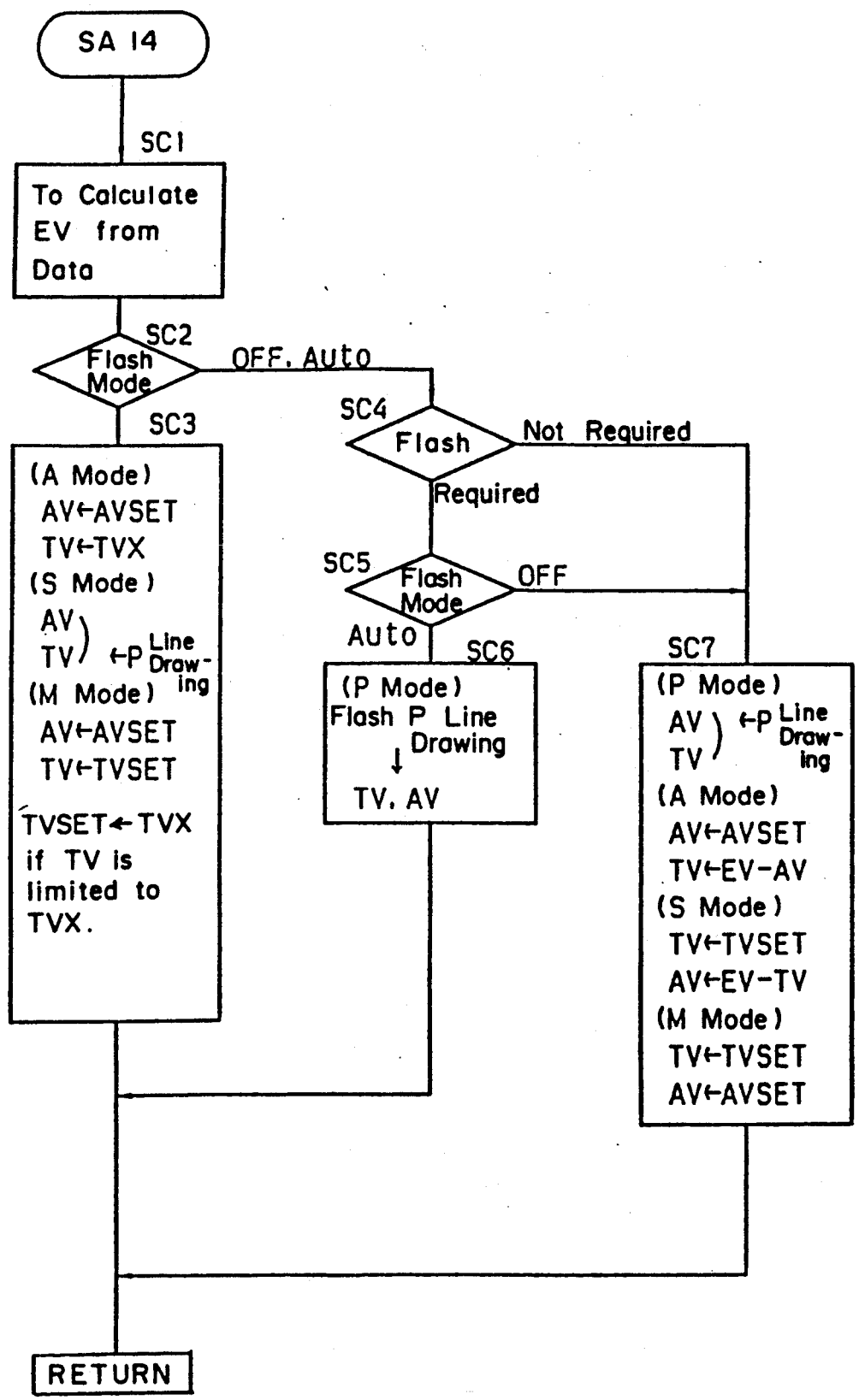

The exposure control calculating routine which has been described as executed at step SA14 will now be described in detail with reference to FIG. 7.

Simultaneous with the execution of step SA14, step SC1 takes place to calculate the EV value on the basis of the measured brightness data, the lens data and the film sensitivity data read by the film speed reader DX, the details of which are not herein discussed. Then, at step SC2, a decision is made to determine the flash firing mode. Should the result of decision at step SC2 indicate that any one of the built-in flash unit and the extra flash unit is set in the forced firing mode (ON), step SC3 takes place, or otherwise step SC4 takes place.

At step SC3, in compliance with the exposure control mode, the aperture control value AV and the shutter speed control value TV, both for flashlight photography in the camera system, are determined. In other words, during the A mode, the preset aperture value AVSET is chosen for the aperture control value AV and the maximum available synchro shutter speed TVx for the synchronization under a flash lighting photography is chosen for the shutter speed control value TV. On the other hand, during the S mode, both of the shutter speed control value TV and the aperture control value AV are calculated from the EV value in reference to a flash P line drawing. During the M mode, however, the preset aperture value AVSET and the preset shutter speed value TVSET are chosen for the aperture control value AV and the shutter speed control value TV, respectively. However, since the flash lighting photography requires the shutter speed to be restricted to the maximum available synchro shutter speed TVx, the maximum available synchro shutter speed TVx is chosen for the shutter speed control value TV or the preset shutter speed value TVSET is substituted by the maximum available synchro shutter speed TVx in the event that the preset shutter speed value TVSET is found exceeding the maximum available synchro shutter speed TVx. This is because, if only the shutter speed control value TV is restricted to the maximum available synchro shutter speed TVx when the preset shutter speed value TVSET is found exceeding the maximum available synchro shutter speed TVx, the shutter speed control value TV would not vary unless the down-shift switch DOS is manipulated a number of times even though the preset shutter speed value TVSET may be down-shifted as a result of the manipulation of the down-shift switch DOS.

On the other hand, if the result of decision at step SC2 indicates that the flash firing mode is not ON, step SC4 takes place to determine if a flash lighting is required during the actual photo-taking. The flash lighting is required on such occasions in which the camera tends to be wobbled because of long shutter speed due to the low brightness and/or a multi-divided light measurement indicates that the target object to be photographed is back-lightened, as is well known to those skilled in the art.

Where the flash lighting is required as determined at step SC4, step SC5 takes place to determine the flash firing mode. Should the result of decision at step SC5 indicate that any one of the built-in and extra flash units is set in the Auto mode, step SC6 takes place at which both of the shutter speed control value TV and the aperture control value AV are calculated from the EV value in reference to the flash P line drawing.

On the other hand, should the result of decision at step SC4 indicate that no flash firing is required, or should the result of decision at step SC5 indicate that the built-in flash unit is set in the flash inhibiting mode (OFF) and the extra flash unit has not yet been mounted on the accessory shoe 12 on the camera body 2 or is set in the OFF mode, the program flow proceeds to step SC7.

At step SC7, both of the aperture control value AV and the shutter speed control value TV for the phototaking occasion under natural lighting are calculated according to the exposure control mode. In other words, during the P mode, both of the aperture control value AV and the shutter speed control value TV are calculated from the EV value in reference to a natural P line drawing; during the A mode, the preset aperture value AVSET is chosen for the aperture control value AV and the difference between the EV value and the aperture control value AV is chosen for the shutter speed control value TV; during the S mode, the preset shutter speed value TVSET is chosen for the shutter speed control value TV and the difference between the EV value and the shutter speed control value TV is chosen for the aperture control value AV; and during the M mode, the preset aperture value AVSET and the preset shutter speed value TVSET are chosen respectively for the aperture control value AV and the shutter speed control value TV.

Figure 8B:
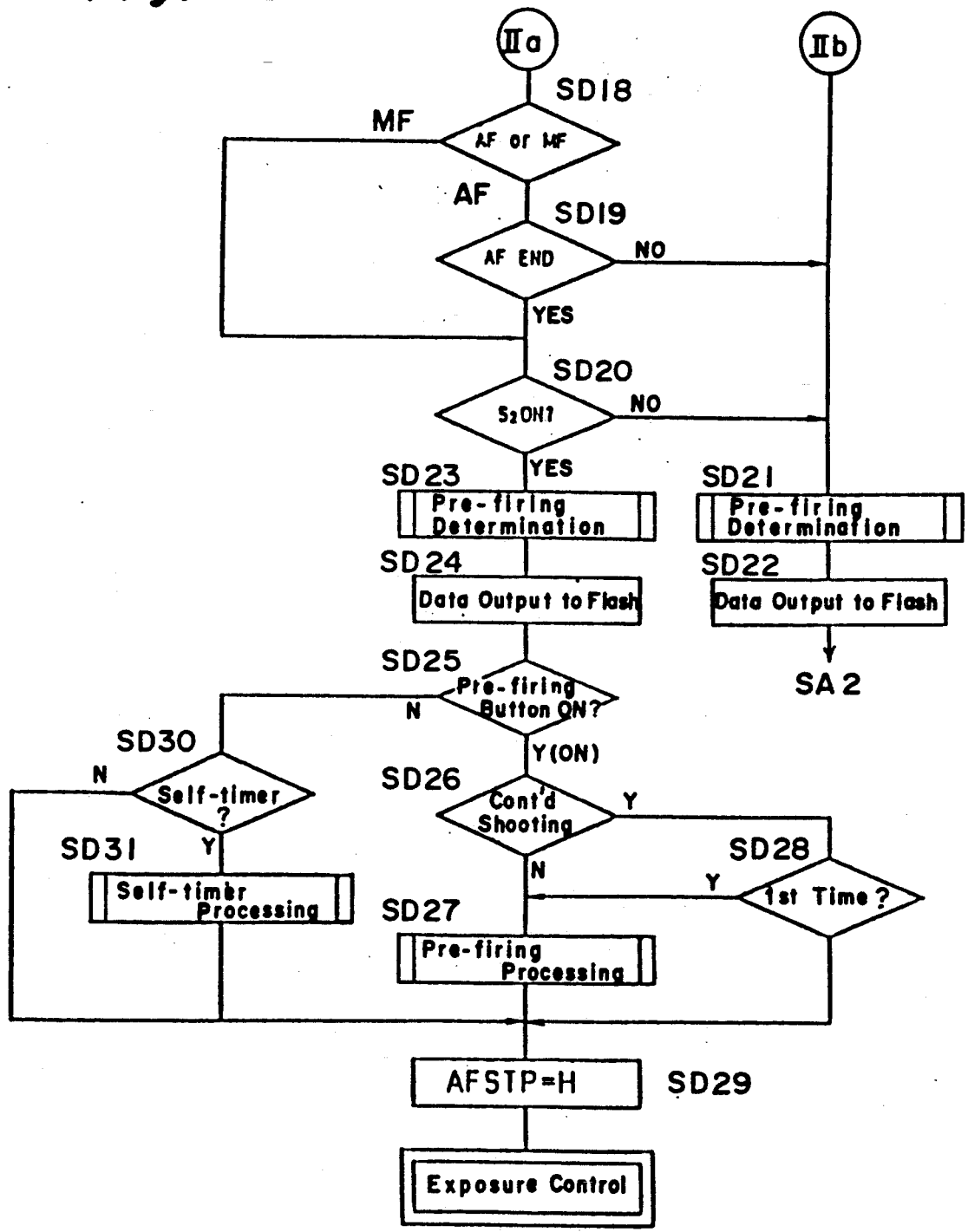

After the execution of any one of steps SC3, SC6 and SC7, the exposure control calculating routine at step SA14 is terminated, allowing the program flow to proceed to step SA15. FIG. 8 comprised of FIGS. 8A and 8B illustrates a main flowchart for a system of avoiding the possible occurrence of the red-eye phenomenon, which will now be discussed.

Referring now to FIG. 8, at step SD1, a decision is made to determine if the flash lighting is required and, if the flash lighting is required, the program flow proceeds to step SD2 at which another decision is made to determine if the built-in flash unit is set in the ON mode. If the built-in flash unit is set in the ON mode, a further decision is made at step SD3 to determine if the built-in flash unit has been charged. Should the result of decision at step SD3 indicate that the built-in flash unit has not yet been completely charged, the charge marking LLD and the flash marking CHLD are switched on and off, respectively, at step SD4 to indicate that the built-in flash unit is being charged. The switching on and off of and the blinking of the displays are carried out by the following control. Data necessary to switch the individual displays on or off or to blink them are supplied from the main microcomputer CCPU through the data bus SDB to the display driver DSP. In response to these data, the display driver DSP causes the markings LLD, PRLD, CHLD, INLD and LCLD to be switched on or off or to blink according to the contents of the data.

After a voltage boosting of the voltage boosting circuit of the built-in flash unit has been started at step SD5, the program flow returns to step SD3. In this way, the program flow from step SD3 to step SD5 is repeated until the built-in flash unit is charged. Should the result of decision at step SD2 indicate that the built-in flash unit is set in the OFF mode or when the built-in flash unit is brought into a condition in which it has been charged, step SD6 takes place to interrupt the charging of the built-in flash unit.

At step SD7, a decision is made to determine whether or not the extra flash unit has been mounted and a power source is ON. If the result of decision at step SD7 indicates that the power source is ON, step SD8 takes place to determine if the extra flash unit has been charged and, if it has been charged, the charge marking LLD and the flash marking CHLD are switched off and on, respectively, at step SD9.

At step SD10, a flag indicative of the completion of charging is set up.

On the other hand, if the result of decision at step SD8 indicates that the extra flash unit has not yet been charged, step SD14 takes place to switch the charge marking LLD and the flash marking CHLD on and off, respectively, followed by the resetting at step SD15 of the flag indicative of the charge completion. Should the result of decision at step SD7 indicate that the extra flash unit has not been mounted, or the power source is OFF, the program flow proceeds to step SD11 at which a decision is made to determine if the built-in flash unit is ON. Since the built-in flash unit is necessarily in the charged condition for the purpose of the program flow of step SD3 to step SD5 if it is ON, the program flow proceeds to step SD9, at which the charge marking LLD and the flash marking CHLD are switched off and on, respectively, and then to step SD10 at which the charge completion flag is set. On the other hand, if the built-in flash unit is OFF, step SD12 takes place at which the charge marking LLD is caused to blink and the flash marking CHLD is switched off. Thus, the blinking of the charge marking LLD is indicative of the necessity of the flash lighting and takes place when the built-in flash unit is OFF and the extra flash unit has not been mounted, inviting a photographer to mount the extra flash unit on the camera body.

It is to be noted that in the illustrated embodiment the display to indicate that the charging is taking place is concurrently used to invite the photographer to mount the extra flash unit. However, as an alternative method, different displays for these different purposes may be employed.

Where the result of decision at step SD1 indicates that no flash lighting is required, the program flow proceeds to step SD16 at which both of the charge and flash markings LLD and CHLD are switched off, followed by the resetting of the charge completion flag at step SD17. At step SD18, a decision is made to determine whether the AF mode is selected for the focus adjusting mode of the camera system or whether the manual (MF) mode is selected for the focus adjusting mode of the camera system. If the AF mode is selected, a decision is made at step SD19 to determine if the AF operation has been completed and, if it has been completed, the program flow proceeds to step SD20. On the other hand, if the result of decision at step SD18 indicates the selection of the MF mode, the program flow skips step SD19 onto step SD20.

At step SD20, a decision is made to determine if the second shutter switch S2 is closed as a result of the second stage depression of the shutter release button 4 and, in the event of the closure of the switch S2, it means the shutter release and, therefore, the program flow proceeds to a pre-firing determination subroutine at step SD23. On the other hand, if the shutter release button has not been depressed through the second stage of stroke, that is, if the second shutter switch S2 has not been closed, the program flow proceeds to a pre-firing determination subroutine at step SD21, followed by step SD22 at which data are outputted to the extra flash unit, with the program flow subsequently returning to step SA2 shown in FIG. 2. The data supplied to the extra flash unit include a flag indicative of whether or not the flash lighting is required, the mode of the camera system, a data on the amount of pre-fired light and a flag indicative of whether or not the extra flash unit can preliminarily fired. At step SD24, a process similar to that executed at step SD22 is executed, followed by step SD25.

At step SD25, a decision is made to determine if the pre-firing button 26 is depressed. Should the pre-firing button 26 be depressed, the program flow proceeds to step SD26 at which a decision is made to determine the drive mode of the camera system. Where the continuous shooting mode is selected, the program flow proceeds to step SD28 at which a decision is made to determine if the photo-taking is carried our for the first time. If it is determined as the first time, a pre-firing processing subroutine is executed at step SD27. On the other hand, if the result of decision at step SD28 indicates that the photo-taking is carried out for the second time et seq., the program flow proceeds to step SD29. In other words, during the continuous shooting, the pre-firing is effected only when the shutter release is carried out for the first time and will not be effected in the event that the shutter release is carried out on subsequent occasions. Where the result of decision at step SD25 indicates that the pre-firing button 26 is not depressed, the program flow proceeds to step SD30 at which a decision is made to determine if the self-timer mode is selected for the drive mode of the camera system. In the event of the self-timer mode as determined at step SD30, a self-timer processing subroutine as will be described later is executed at step SD31, followed by step SD29. Should the result of decision at step SD30 indicate the selection of a mode other than the self-timer mode, the program flow skips step SD31 onto step SD29. At step SD29, the AF drive motor is halted, followed by the previously described exposure control routine.

Figure 9B:
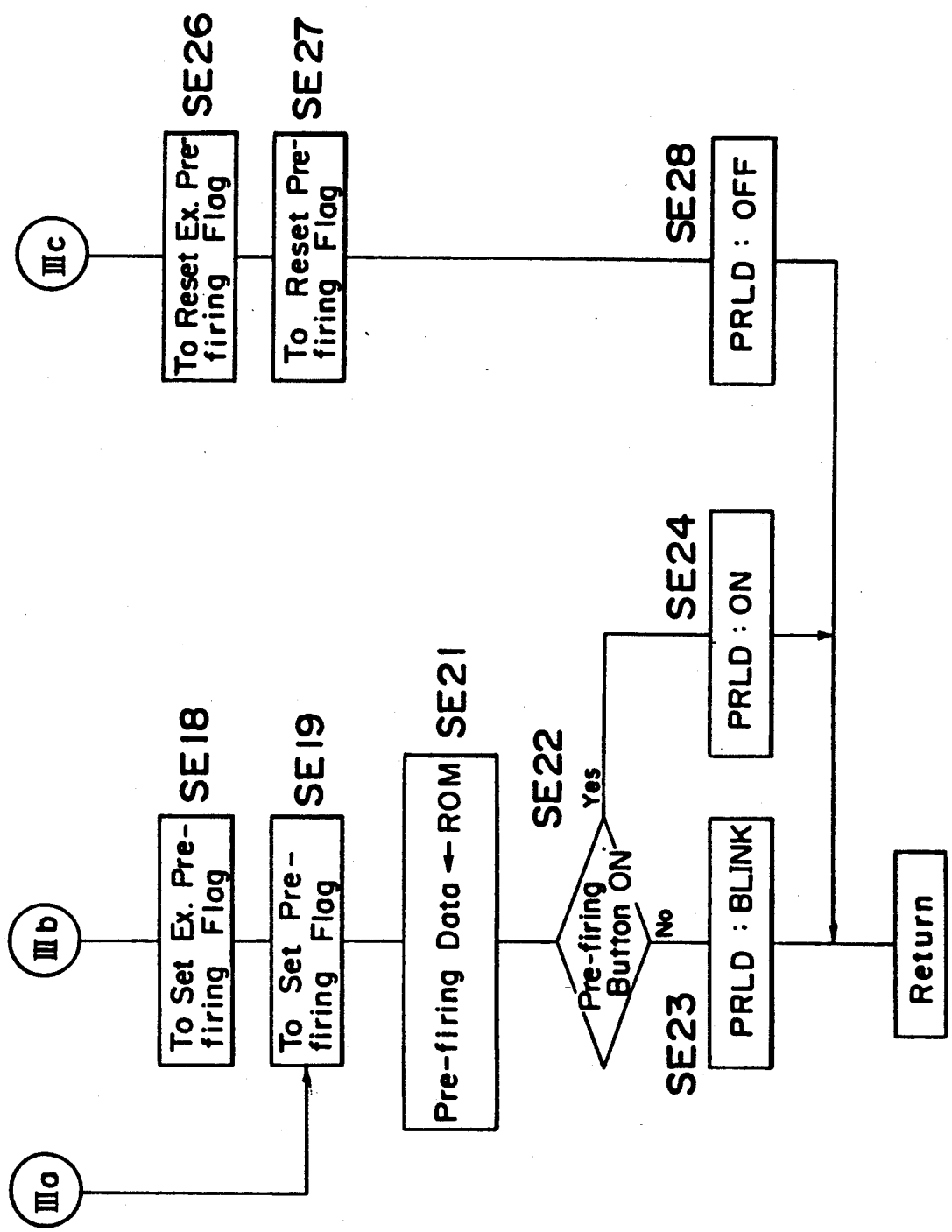

The pre-firing determination subroutine referred to above and executed at step SD21 and also at step SD23 of FIG. 8 is shown in FIG. 9 comprised of FIGS. 9A and 9B. Referring to FIG. 9, at step SE1 a decision is made to determine the focus adjusting mode. In other words, a decision at step SE1 is to determine whether the continuous AF mode in which the AF operation is repeated at all times is selected for the focus adjusting mode, or whether the one-shot AF mode in which, once the target object is brought into the in-focus condition, the subsequent AF operation ceases is selected for the focus adjusting mode. Where the continuous AF mode is found as selected, it means that the target object to be photographed is assumed to be a moving body. As will be described later, the time interval between the pre-firing and the actual photo-taking is about 0.7 to about 1.2 second and it is not possible to predicate during this time interval where and how the target object move. Under these circumstances, the possibility of occurrence of the red-eye phenomenon can hardly be predicated and, therefore, the program flow proceeds to step SE25. On the other hand, where the result of decision at step SE1 indicates that the AF function is not under the continuous AF mode, the program flow proceeds to step SE2 at which a decision is made to determine if the extra flash unit is ON. If the result of decision at step SE2 indicates that the extra flash unit is ON, another decision is made at step SE3 to determine if the target object is within a flash available range, as defined below, according to the following formulas.

DV(AF)>DV(FL) ... Within the flash available range

DV(AF)<DV(FL) ... Out of the flash available range wherein DV(AF) represents distance information fed by the AF unit AFC and DV(FL) represents information determined by the following equation.

$$DV(FL)=IV+SV-AV$$

wherein IV represents the amount of light emitted by the extra flash unit, SV represents the film sensitivity and AV represents an aperture control value.

Where the target object is found to be within the flash available range, it is determined that a proper amount of light fired by the extra flash unit can reach the target object and, therefore, the program flow proceeds to step SE4. On the other hand, where the extra flash unit is found to be out of the flash available range, it means that any countermeasure against the possible occurrence of the red-eye phenomenon is of no use, because no proper exposure can be obtained, and therefore, the program flow proceeds to step SE25. At step SE4, a decision is made to determine if the target object is back-lightened, and if it is not back-lightened, the program flow proceeds to step SE5.

At step SE5, a decision is made to determine if the flash lighting is required and, if required, step SE6 takes place at which the photo-taking magnification $\beta$ is calculated according to the following equation and, if the photo-taking magnification is found to be of a value not greater than a predetermined value, for example, 1/85, the program flow proceeds to step SE7.

$$\beta=f/DV(AF) \text{ (f: Focal length).}$$

As will be described later, the program flow to step SE7 is indicative of the possible occurrence of the red-eye phenomenon. In other words, if the photo-taking magnification is low as determined at step SE6, the red-eye phenomenon which would be found on a photo of the target object may be deemed not objectionable regardless of the occurrence of the red-eye phenomenon and, therefore, a routine at which no countermeasure against the possible occurrence of the red-eye phenomenon is executed at step SE25. On the other hand, at step SE7, a decision is made to determine if the brightness of the target object is of a value enough to enhance the occurrence of the red-eye phenomenon (red-eye brightness), for example, if it is not higher than BV1. This brightness information is represented by the absolute brightness information which corresponds to the difference between the information furnished by the light measuring circuit LMC and an error in full aperture contained in the information furnished by the lens circuit LEC in the lens assembly. If the brightness is found to be lower than the red-eye brightness, the program flow proceeds to step SE8 at which a decision is made to determine if the photo-taking distance DV(AF) is of a value not greater than a predetermined distance.

If the photo-taking distance DV(AF) is greater than the quotient of the distance FL, as defined between the optical path of the flash unit and the optical axis of the camera lens assembly, divided by, for example, tan 2°, it is deemed that there is a possibility of occurrence of the red-eye phenomenon and, therefore, the program flow proceeds to step SE9. This is because there may be a relatively high possibility of occurrence of the red-eye phenomenon, if as viewed from the position of the target object the angle between the optical path of the flash unit and the optical axis of the camera lens assembly is not greater than, for example, 2°. Thus, it can readily be understood that, during the execution of the program flow from step SE4 to step SE8, the determination is made to find the possibility of occurrence of the red-eye phenomenon. Briefly speaking, under the circumstances in which all of the conditions that the flash lighting is required, the target object is not backlightened, the photo-taking magnification is relatively low, the brightness is not higher than the predetermined brightness, and the photo-taking distance is not smaller than the predetermined value, are met, it is determined that the possibility of occurrence of the red-eye phenomenon is high and, therefore, any countermeasure (pre-firing) is required.

Unless all of the foregoing conditions are met, the program flow proceeds to step SE25.

Figure 20A:
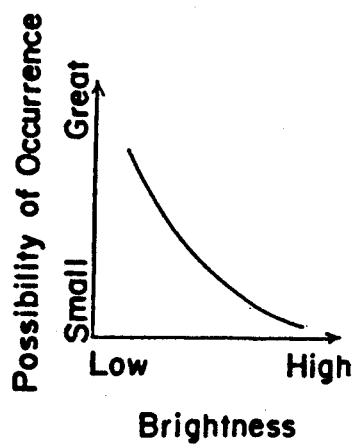
FIG. 20(a) is a graph showing the relationship between the possibility of occurrence of the red-eye phenomenon and the brightness of a target object to be photographed.
Figure 20B:
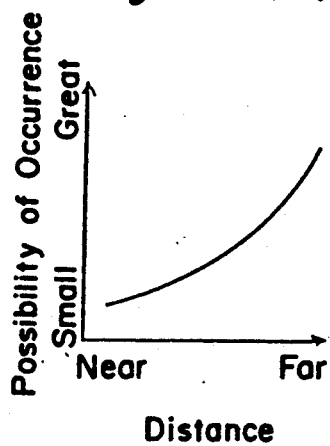
FIG. 20(b) is a graph showing the relationship between the possibility of occurrence of the red-eye phenomenon and the distance to the target object.

FIGS. 20(a) and 20(b) illustrate graphs showing the relationship between the possibility of occurrence of the red-eye phenomenon and the brightness and that between the possibility of occurrence of the red-eye phenomenon and the distance, respectively. The higher the brightness, the smaller the pupils of the eyes of the target object, and therefore, the possibility of occurrence of the red-eye phenomenon is low. Also, the longer the distance, the smaller the angle between the optical path of the flash unit and the optical axis of the camera lens assembly as viewed from the target object, and therefore, the possibility of occurrence of the red-eye phenomenon is high.

Figure 20C:
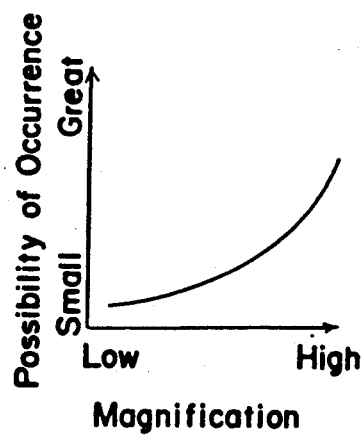
FIG. 20(c) is a graph showing the relationship between the possibility of occurrence of the red-eye phenomenon and the photo-taking magnification.

FIG. 20(c) illustrates a graph showing the relationship between the photo-taking magnification and the feeling that the photographer may have in relation to the red-eye phenomenon appearing in the resultant photo of the target object. Assuming that the image of the target object has been photographically printed on a photo sheet of popular size, for example, a service size, the smaller the photo-taking magnification, the more minimized the red-eye phenomenon to such an extent that the resultant photo when viewed within the field of sight would no longer be objectionable. Conversely, if the photo-taking magnification is large, the resultant photo would be considered objectionable.

At step SE25, a decision is made to determine if the pre-firing button 26 has been depressed. If the pre-firing button 26 has not yet been depressed, step SE26 takes place to reset a flag indicative of whether or not the pre-firing of the extra flash unit is to be effected so that the extra flash unit will not be preliminarily fired, followed by step SE27 at which a flag indicative of whether or not the pre-firing of the built-in flash unit is to be effected is reset to inhibit the pre-firing. Then, at step SE28, the pre-firing marking PRLD indicative of the necessity of the pre-firing is switched off. On the other hand, if the result of decision at step SE25 indicates that the pre-firing button 26 is depressed, the program flow proceeds to step SE9. This is for the purpose of effecting the pre-firing, even though all of the conditions associated with the possible occurrence of the red-eye phenomenon are not met, so that the photographer's desire to effect the pre-firing can be accommodated. At step SE9, a decision is made to determine whether the built-in flash unit is ON or OFF. If the built-in flash unit is ON, the program flow proceeds to step SE10. During the execution of the program flow from step SE10 to step SE12, determination is made of whether or not the extra flash unit is required to be preliminarily fired. If the extra flash unit is ON (step SE10), if it is the flash unit capable of being preliminarily fired (step SE11) and if it is opposed to the target object (step SE12), the program flow proceeds to step SE18 at which the pre-firing flag is set. As hereinbefore described, these data are supplied to the extra flash unit in readiness for the actual pre-firing.

In the event of the lack of even one of the conditions in steps SE10 to SE12, the program flow proceeds to step SE20 at which the pre-firing flag for the extra flash unit is reset, followed by step SE19. In other words, in the event of the lack of even one of the conditions required to meet for the actual pre-firing of the extra flash unit during the execution of the program flow from step SE10 to step SE12, the built-in flash will be pre-fired.

Should the result of decision at step SE9 indicate that the built-in flash unit is OFF, the program flow proceeds to step SE14. The program flow from step SE14 to step SE16 is a routine identical with the program flow from step SE10 to step SE12 and, therefore, in the event that the conditions for the pre-firing of the extra flash unit are met, the program flow proceeds to step SE18. In the event of the lack of even one of those conditions, no pre-firing take place because the built-in flash unit is OFF, and therefore, the program flow proceeds to step SE26.

At step SE21, data of the amount of light which may be preliminarily fired and which are written in a read-only memory (ROM) at addresses specified by the brightness, the magnification and the distance to the target object are read out from the ROM.

Figure 21A:
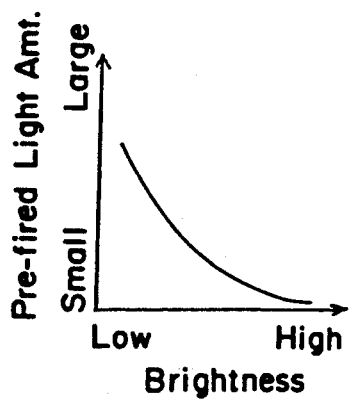
FIGS. 21(a) to 21(c) are graphs showing the relationships between the amount of pre-fired light and the brightness of the target object, the photo-taking magnification and the distance to the target object, respectively.
Figure 21B:
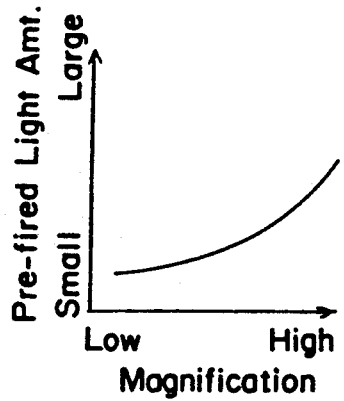
Figure 21C:
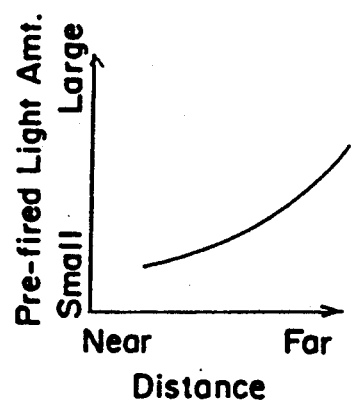

FIGS. 21(a), 21(b) and 21(c) illustrate graphs showing the relationship between the pre-fired light amount and the brightness, the magnification and the distance, respectively.

As shown in FIG. 21(a), the higher the brightness, the lower the pre-fired light amount. This is because, if the brightness is high, the red-eye phenomenon is considerable and, therefore, the pre-fired light amount is reduced to minimize the occurrence of the red-eye phenomenon. Also, as shown in FIG. 21(c), if the distance is small, the possibility of occurrence of the red-eye phenomenon is small and, therefore, an effect of preventing the occurrence of the red-eye phenomenon can be appreciated even though the pre-fired light amount is low. The data of the pre-fired light amount are determined in consideration of the above discussed factors.

These data are supplied to the extra flash unit as hereinbefore described to determine the pre-fired light amount. At step SE22, a decision is made to determine if the pre-firing button 26 is depressed, and, if it is not depressed, step SE24 takes place to switch the pre-firing marking PRLD on to indicate that the pre-firing button 26 is depressed as shown in FIG. 4(e). In this illustrated instance, the display indicative of the necessity of the pre-firing, that is, the blinking of the marking PRLD as shown in FIG. 4(d), is effected by one and the same display element, but a separate display element which may be lit at all times can be provided for. The pre-firing marking PRLD shown in FIG. 4(f) is an alternative embodiment of the marking PRLD shown in FIG. 4(a) wherein, when the pre-firing is required, the image of the eye can be displayed in red color. However, the prefiring marking PRLD can be switched off when the pre-firing button is depressed. This system of display is direct and can easily be perceived with respect to the possible occurrence of the red-eye phenomenon.

After the execution of any one of steps SE23, SE24 and SE28, the program flow returns to the main routine.

Figure 10:
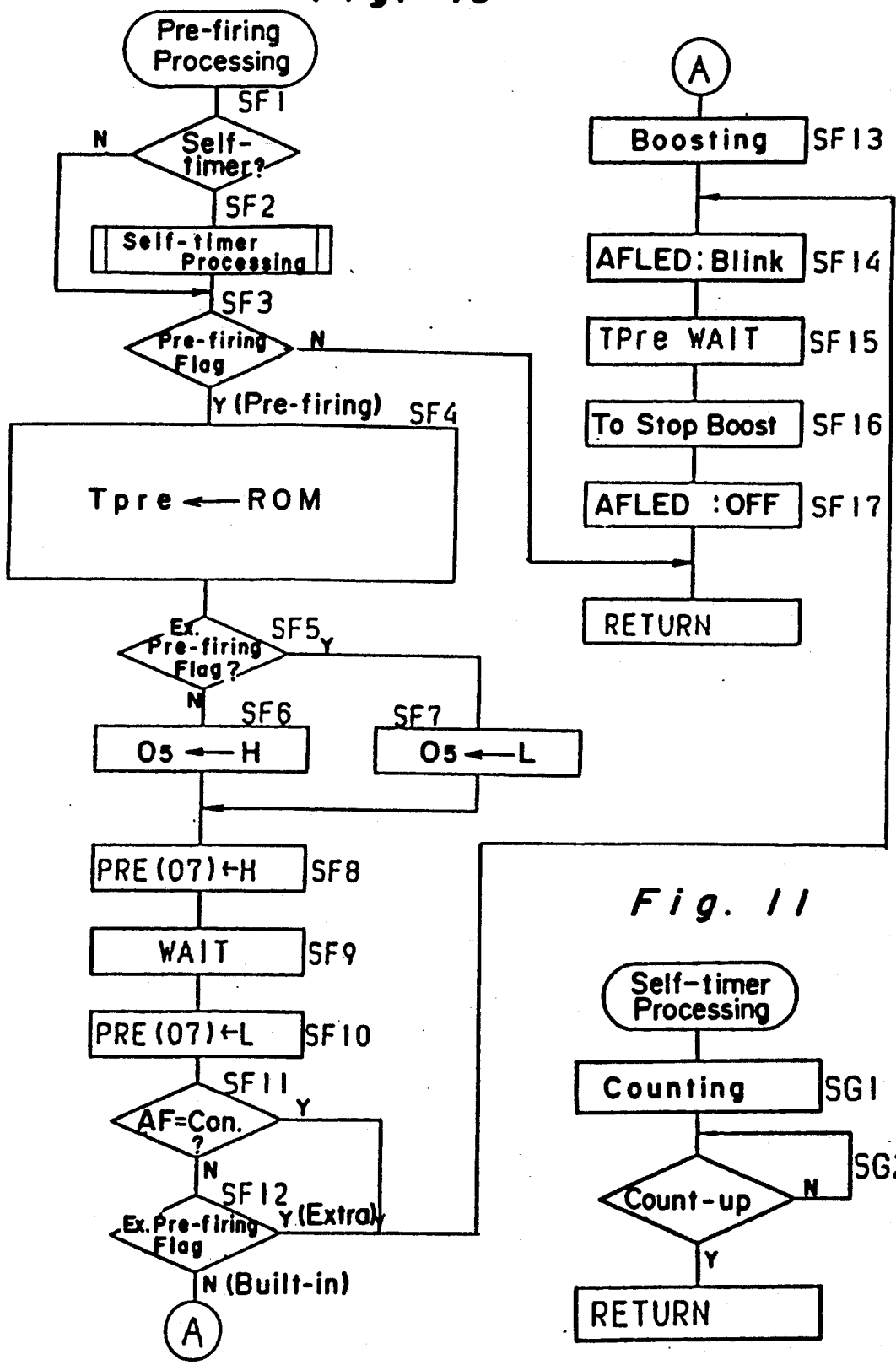

FIG. 10 illustrates a routine for controlling the pre-firing, namely, a pre-firing processing routine. This pre-firing processing routine starts with step SF1 at which a decision is made to determine if the photo-taking under a self-timer control takes place and, if it indicates that the self-timer is utilized for the actual photo-taking, the program flow proceeds to step SF2 at which a self-timer processing subroutine is executed. If no self-timer is utilized, step SF2 is not executed and, instead, step SF3 is executed at which a decision is made to determine the status of the pre-firing flag. When the result of decision at step SF3 indicates that the pre-firing is to be effected and that the pre-firing is not effected, the program flow proceeds to step SF4 and to the main routine, respectively. At step SF4, a data of the time interval Tpre between the pre-firing and the exposure is read from the read-only memory (ROM) stored at an address specified by the brightness, the magnification and the distance to the target object.

Figure 22A:
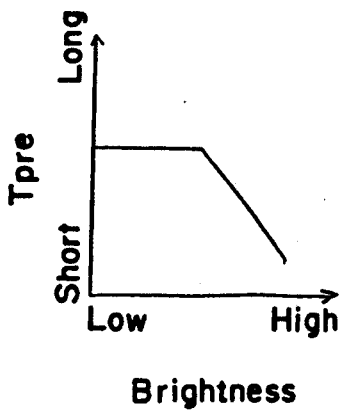
FIGS. 22(a) to 22(c) are graphs showing the relationships between the time interval Tpre between the pre-firing and the film exposure and the brightness of the target object, the photo-taking magnification and the distance to the target object.
Figure 22B:
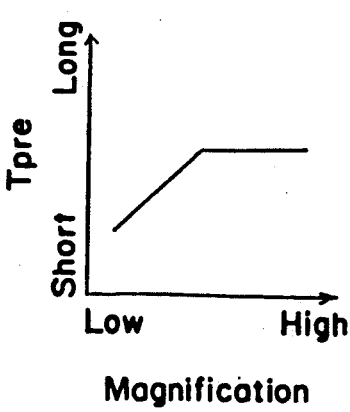
Figure 22C:
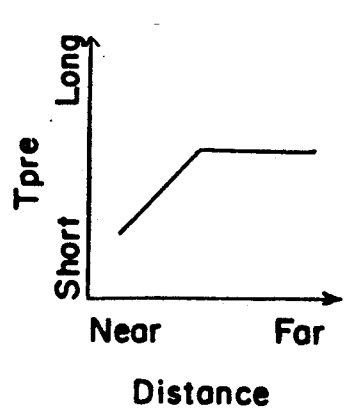

FIGS. 22(a), 22(b) and 22(c) illustrate graphs showing the relationship between the time interval Tpre and the brightness, the magnification and the distance to the target object, respectively.

The higher the brightness, the smaller the pupils of the eyes of the target object. Therefore, as shown in FIG. 22(a), the effect of preventing the possible occurrence of the red-eye phenomenon can be sufficiently obtained even if the time interval Tpre is small. The reason that the time interval Tpre will not vary even though the brightness is of a value not higher than the predetermined value is because, if the time longer than a predetermined time is provided, the pupils once closed as a result of the pre-firing are opened and, therefore, the pre-firing brings about no effect.

As shown in FIG. 22(b), the lower the magnification, the minimized the feeling to the red-eye phenomenon appearing on the photo of the target object. Therefore, the pre-firing brings about effects even if the time interval Tpre is reduced. The reason that the time interval Tpre does not prolong when the magnification is of a value not lower than the predetermined value is because of the reason stated in connection with the brightness above.

As shown in FIG. 22(c), the greater the distance to the target object, the lower the possibility of occurrence of the red-eye phenomenon. Therefore, the pre-firing can bring about effects even if the time interval Tpre is reduced. The reason that the time interval Tpre will not prolong even through the distance to the target object is of a value not smaller than the predetermined value is because of the reason stated in connection with the brightness above.

At step SF5, a decision is made to determine the status of the flag indicative of the pre-firing of the extra flash unit as hereinbefore described. Where the result of decision indicates that the extra flash unit is to be fired, the program flow proceeds to step SF7 at which an output terminal O5 of the main microcomputer CCPU is rendered to be in a low level state. Since the built-in flash unit control circuit FLGC is so designed and so structured that, when the output terminal O5 is in the low level state, no signal BTRG will be outputted even though an output terminal O7 is rendered to be in a high level state, the built-in flash unit will not be pre-fired even when a pre-firing signal (a pulse appearing at the output terminal O7 of the main microcomputer) is outputted. On the other hand, when the result of decision indicates that the extra flash unit is not to be pre-fired, the program flow proceeds to step SF6 at which the output terminal O5 is rendered in the high level state, making it possible for the built-in flash unit to be pre-fired.

During the execution of the program flow from step SF8 to step SF10, a pulse of a predetermined time is outputted from the output terminal O7. This output terminal O7 is also connected with the extra flash unit OFL and, therefore, the extra flash unit can be fired if the extra flash unit is pre-fired as a result of the high level state at the output terminal O7, but the built-in flash unit can be fired if the built-in flash unit is pre-fired as a result of the high level state at the output terminal O7. At this time, the extra flash unit is so designed as to be pre-fired in accordance with the pre-firing light amount data supplied from the camera to the extra flash unit as hereinbefore described. Also, the built-in flash unit control circuit FLGC is so designed and so structured that the built-in flash unit can emit a predetermined amount of light. In other words, when the output terminal O7 is rendered in the high level state, the control circuit FLGC causes the signal BTRG to be in a high level state (this signal BTRG will not be outputted if the output terminal O5 is in the low level state) to cause the built-in flash unit to be pre-fired and to render the signal FSTP to be in a high level state after a predetermined time to halt the pre-firing of the built-in flash unit.

At step SF11, a decision is made to determine whether or not the AF mode is the continuous AF mode. If the result of decision at step SF11 indicates that the continuous AF mode is not selected for the AF mode, step SF12 takes place at which a decision is made to determine if the extra flash unit is pre-fired. Unless the extra flash unit is pre-fired, it means that the built-in flash unit is pre-fired and, therefore, the program flow proceeds to step SF13 at which the voltage boosting is started by a converter in the built-in flash unit so as to compensate for the energies consumed during the pre-firing of the built-in flash unit.

On the other hand, if the result of decision at step SF11 indicates that the continuous AF mode is selected for the AF mode, the program flow skips step SF13 onto step SF14 for the purpose of securing a voltage necessary to drive the motor for the AF operation. Also, where the result of decision at step SF12 indicates that the extra flash unit is pre-fired, no energy of the built-in flash unit is consumed and, therefore, the program flow skips step SF13 onto step SF14.

At step SF14, a data indicating that now it is a time between the pre-firing and the photo-taking is supplied through the serial data bus SDB to the AF unit AFC, causing the latter to blink an AFLED. At step SF15, a wait is made for the time interval Tpre and, at step SF16, the boosting ceases, followed by step SF17 at which the blinking of the AFLED of the AF unit ceases. Thereafter, the program flow returns to the main routine.

Figure 11:
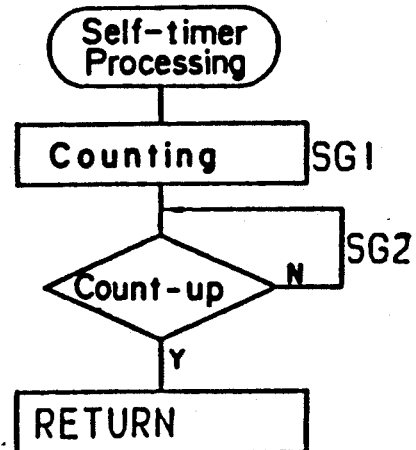

The self-timer processing subroutine executed at step SF2 of the program flow of FIG. 10 is shown in FIG. 11. This self-timer processing subroutine starts with step SG1 at which a counter for counting the length of time during which the self-timer is operated is reset and started, followed by step SG2 at which a decision is made to determine if the counter has attained a predetermined count or more. Unless the counter has attained the predetermined count, step SG2 is repeated until the counter has counted the length of time during which the self-timer is operated, followed by the return of the program flow to the main routine. It is to be noted that, during the repeated execution of step SG2, a SLD is caused to blink to indicate that the self-timer is being operated.

Figure 13:
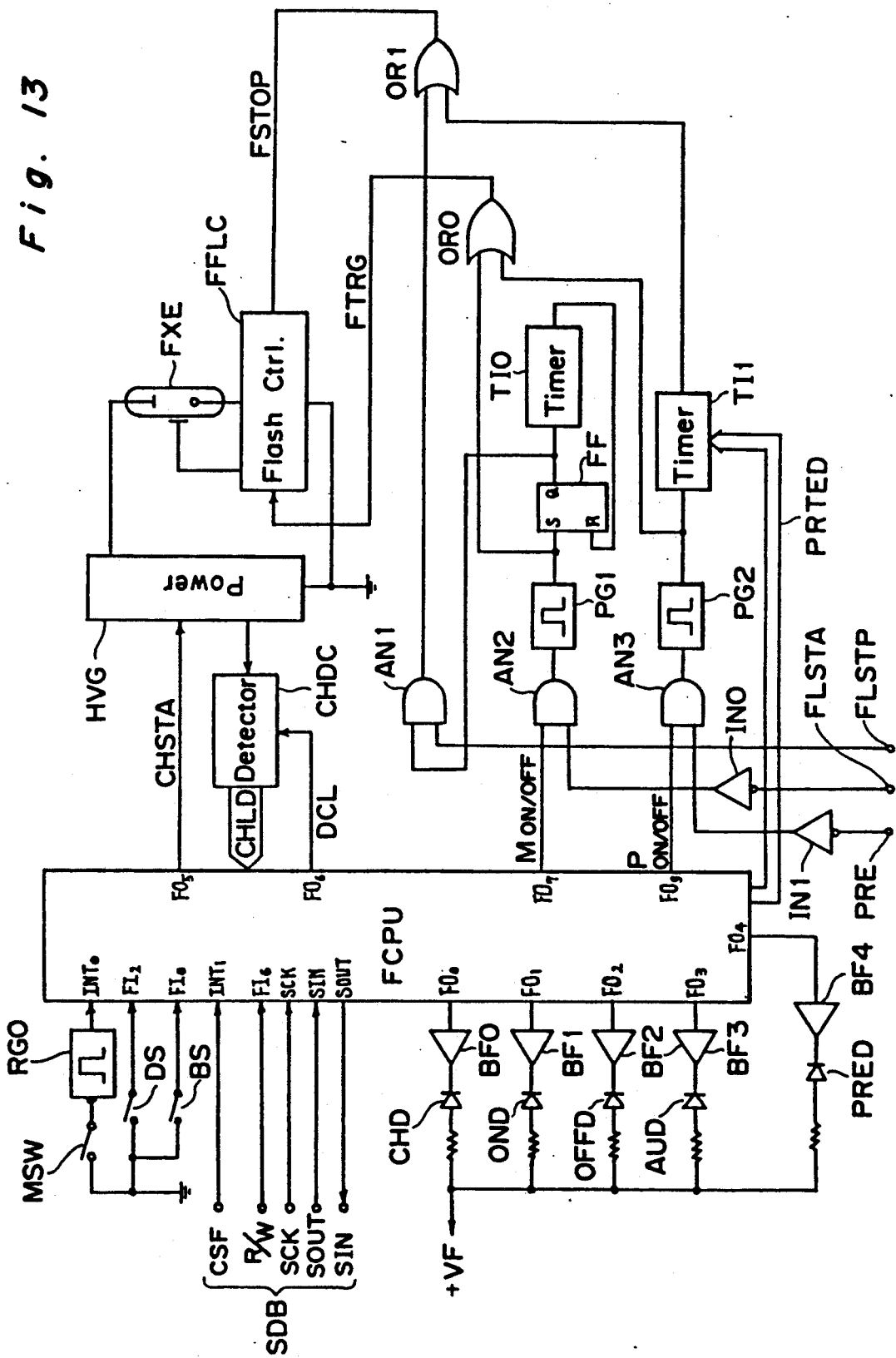

FIG. 13 illustrate an electric circuit arrangement employed in the extra flash unit to which the present invention is applied. The extra flash unit can be used in practice as mounted on the camera system shown in and described with reference to FIGS. 1 to 11.

Referring now to FIG. 13, reference character FCPU represents a flash microcomputer used to control the sequence of operation of the extra flash unit. Reference character SDB represents a serial data bus for the data transmission therethrough between the extra flash unit and the main microcomputer CCPU in the camera body 2. This serial data bus is connected with the following terminals. Reference character CSF represents a chip select flash rterminal which may be rendered to be in a low level state when the main microcomputer CCPU in the camera body specifies the extra flash unit as a party to which it communicates. This terminal CSF is connected with an interruption terminal $INT_1$ of the flash microcomputer FCPU which may be started when it is set down to the low level state. An R/W terminal is a terminal which may be brought in a low level state when the main microcomputer CCPU in the camera body reads the data, but in a high level state when the main microcomputer CCPU outputs the data. Reference character SCK represents a clock output terminal from which a clock signal is outputted for the synchronization when the main microcomputer CCPU performs a serial data communication with other circuits. Reference character SOUT represents a serial data output terminal through which the main microcomputer CCPU performs a serial data communication with the other circuits (including, as far as shown in FIG. 3, the extra flash unit OFL, the light measuring circuit LMC, the AF unit AFC, the lens circuit LEC in the interchangeable lens assembly, the display circuit DSP and the film sensitivity reader DX) and which is connected with a serial data input terminal SIN of the flash microcomputer FCPU. Reference character SIN represents the serial data input terminal through which data are serially inputted to the main microcomputer CCPU from the other circuits and which is connected with a serial data output terminal SOUT of the flash microcomputer FCPU.

Reference character MSW represents a main switch for switching the flash unit selectively ON and OFF. Each time the main switch MSW is closed (ON), a pulse generator PGO outputs a pulse to an interruption terminal $INT_0$ of the flash microcomputer FCPU to drive the latter. Reference character DS represents a detector switch adapted to be switched on when the extra flash unit is mounted directly on the accessory shoe on the camera body and off when and so long as the extra flash unit is not directly mounted on the accessory shoe on the camera body.; and reference character BS represents a detector switch adapted to be switched on when a flash firing window of the flash unit is set in a bounce-lighting position, but off when the flash firing window is set in a position oriented towards the target object. If the detector switches DS and BS are switched on and off, respectively, it means that the flash unit is directly coupled with the camera body with the flash firing window oriented towards the target object, this condition being one of the conditions that requires a countermeasure to be taken against the possible occurrence of the red-eye phenomenon. On the other hand, if the detector switch DS is switched off, it means that the flash unit is coupled with the camera body through a synchro cable or the like, requiring no countermeasure to be taken against the possible occurrence of the red-eye phenomenon. Also, if the detector switch BS is switched on even though the detector switch DS is switched on, it means that the flash firing window of the flash unit is not oriented direct towards the target object, requiring no countermeasure to be taken against the possible occurrence of the red-eye phenomenon.

Reference character CHD represents a light emitting diode used to indicate that the flash unit has been charged; reference character OND represents a light emitting diode used to indicate that the flash unit is in an ON mode; reference character OFFD represents a light emitting diode used to indicate that the flash unit is in an OFF mode; reference character AUD represents a light emitting diode used to indicate that the flash unit is in an automatic firing mode; reference character PRED represents a light emitting diode used to indicate that the pre-firing is carried out as a countermeasure against the possible occurrence of the red-eye phenomenon; reference characters BF0 to BF4 represent respective buffers for driving the associated light emitting diodes CHD, OND, OFFD, AUD and PRED.

Reference character HVG represents an electric power circuit for the flash firing, which performs a boosting operation when a terminal CHSTA is brought in a high level state, but ceases the boosting when it is brought in a low level state. Reference character CHDC represents a charge detecting circuit which is operable to effect an analog-to-digital conversion of an output voltage of a main capacitor in the power circuit HVG when a signal DCL is brought in a low level state, said circuit CHDC being capable of transmitting detected data to the flash microcomputer FCPU through a data bus CHLD. The detected data are utilized as a data indicative of the amount of light fired and a data indicative of the amount of light pre-fired.

Reference characters PRE, FLSTA and FLSTP represent respective terminals to which a firing control signal is inputted from the camera body. Specifically, the input terminal PRE is adapted to be brought in a low level state at a timing when the pre-firing is to be effected; and the terminal FLSTA is the terminal to which a closure signal indicative of the closure of an X contact SX which takes place upon the completion of travel of the first or a leading curtain of the camera shutter. The input terminal FLSTP is the terminal to which a high level signal is inputted from the flash light measuring circuit FLMC in the camera system when the amount of light fired and subsequently reflected from the target object attains an expected value. Reference character FFLC represents a firing control circuit for a firing tube FXE which is fired when a signal FTRG is brought in a high level state and ceases firing when FSTOP is brought in a high level state.

A signal $P_{ON/OFF}$ is rendered to be in a high level state when a data indicating that the pre-firing is carried out is inputted from the camera body through the data bus SDB. When at this time the terminal PRE is brought in a low level state and inverter IN1 is brought in a high level state, an output of an AND gate AN3 is rendered in a high level state causing a pulse generator PG2 to generate a high level signal, which pulse is in turn supplied through an OR gate ORO to the firing control circuit FFLC to start the pre-firing. Also, when an output from a pulse generator PG2 sets up to a high level state, a timer TI1 starts a counting of time and, after the passage of a predetermined time, for example, 0.1 msec as counted by the timer TI1, a high level pulse is generated from the timer TI1 through an OR gate OR1 to the firing control circuit to interrupt the pre-firing. This is illustrated in a timing chart shown in FIG. 14.

A signal $M_{ON/OFF}$ is brought in a high level state in the event that a firing signal is inputted from the camera when the flash unit is in an ON mode and the manual mode (M mode) is selected for the exposure control mode in the camera causing the flash unit set in the forced firing mode, and when the flash unit is in the ON mode and the automatic mode (P, A and S modes) is selected for the exposure control mode in the camera causing the flash unit set in the automatic firing mode, or otherwise in a low level state. When the X contact SX is closed with the terminal FLSTA brought in a low level state, the output of the inverter IN0 is brought in a high level state and, consequently, an output of an AND gate AN2 is brought in a high level state. Thereby, the pulse generator PG1 outputs a high level pulse which is supplied through the OR gate OR0 to the firing control circuit FFLC to initiate the actual flash firing. On the other hand, a flip-flop FF is set in response to the pulse from the pulse generator PG1 with an Q output brought in a high level state, causing a timer TI0 to initiate a counting of a predetermined time, for example, 2.5 msec. After the counting of the predetermined time performed by the timer TI0, the timer TI0 outputs a pulse to reset the flip-flop FF. The reset Q output is fed to one of inputs of an AND gate AN1 and, during a period in which the Q output is in a high level state, only a pulse outputted from the flash light measuring circuit FLMC in the camera body and inputted through the terminal FLSTP is outputted through the AND gate AN1. This pulse emerging from the AND gate AN1 is supplied to the firing control circuit FFLC through the OR gate OR1 to interrupt the flash firing. This is illustrated in a timing chart of FIG. 15.

While the operation of the extra flash unit will be described with reference to the flowchart shown in FIGS. 16 to 19 and showing the sequence of operation of the flash microcomputer FCPU in the extra flash unit, data transmitted between the flash unit and the camera body will first be discussed.

TABLE

| | Camera to Flash Unit | Flash Unit to Camera |
|---|---|---|
| 1. | Camera exposure control mode | Flash ON/OFF |
| 2. | Fired/Not Fired | Charged/Not Yet Charged |
| 3. | Pre-fired/Not Pre-fired | Pre-firing OK/Not OK |
| 4. | Pre-firing Light Amount | Fired Light Amount |
| 5. | | Opposed/Not Opposed |

The foregoing table illustrates the types of data transmitted from the camera body to the flash unit and from the flash unit to the camera body. The first data that is transmitted from the camera body to the flash unit is the camera exposure control mode which directs the forced firing mode when the manual exposure control mode is inputted while the flash unit is in the ON mode and which directs the automatic firing mode when the automatic exposure control mode (P, A and S modes) is inputted while the flash unit is in the ON mode. The data "Fired/Not Fired" stands for a signal indicative of whether or not the flash firing should be carried out under the automatic firing mode and, in the case of "Fired", the signal $M_{ON/OFF}$ is brought in the high level state to initiate the flash firing upon closure of the X contact SX, whereas, in the case of "Not Fired", the signal $M_{ON/OFF}$ is brought in the low level and no flash firing takes place even if the X contact SX is closed. The data "Pre-fired/Not Pre-fired" stands for a signal indicative of whether or not the pre-firing should be carried out by the extra flash unit and, in the case of "Pre-fired", the terminal $P_{ON/OFF}$ is brought in a high level state so that the pre-firing can be effected in response to the signal inputted from the camera body through the terminal PRE. On the other hand, in the case of "Not Pre-fired", the terminal $P_{ON/OFF}$ is brought in a low level state and no pre-firing is effected. The pre-firing data is a data corresponding to the amount of pre-fired light and, in the illustrated embodiment, the pre-firing is carried for a length of time corresponding to this data.

Hereinafter, the data transmitted from the flash unit to the camera will be discussed. The "Flash ON/OFF" signal transmits the status of the main switch MSW, that is, whether the flash unit is in the ON position or in the OFF position. The "Charged/Not Yet Charged" data means that a charge completion signal is transmitted from the flash unit to the camera body if the voltage charged on the main capacitor in the power circuit HVG has attained a predetermined value, or otherwise a charge incompletion signal is transmitted. The "Pre-firing OK/Not OK" data are used to separate the types of flash unit since there is two type of flash units available, one having a capability of pre-firing and the other having no capability of pre-firing. It is to be noted that the flash unit shown in FIG. 13 is of a type having a capability of pre-firing and, therefore, when in the ON mode, a pre-firing enabling signal is transmitted to the camera body at all times.

Examples of the flash units having the pre-firing capability and having no pre-firing capability will now be discussed with particular reference to FIGS. 12(a) and 12(b). FIG. 12(a) illustrates the extra flash unit 101 having the firing window 101A spaced a substantial distance from the optical axis of the lens assembly 3. With this type of extra flash unit, the possibility of occurrence of the red-eye phenomenon is minimal and, therefore, the extra flash unit is not provided with the pre-firing capability because of the unnecessity of the pre-firing and, therefore, the "Pre-firing Not OK" data is transmitted to the camera body from such extra flash unit 101.

On the other hand, in the extra flash unit 102 shown in FIG. 12(b), the distance between the firing window 102B and the optical axis of the lens assembly 3 makes no difference with that in a camera of a type having the built-in flash unit and, therefore, there is a high possibility of occurrence of the red-eye phenomenon. Therefore, this type of extra flash unit 102 shown in FIG. 12(b) is provided with the pre-firing capability so that the "Pre-firing OK" data can be transmitted from the extra flash unit 102 to the camera body.

It is, however, to be noted that both types of extra flash units shown respectively in FIGS. 12(a) and 12(b) may have the pre-firing capability so that the "Pre-firing OK" data can be transmitted to the camera body and, at the same time, a data of the distance between the firing window and the optical axis of the lens assembly 3 (or the accessory shoe on the camera body on which the flash unit is mounted) can be transmitted to the camera body when the flash unit is mounted on the accessory shoe. With this modified system, it is possible to make a decision to determine if the possibility of occurrence of the red-eye phenomenon is high, in reference to a combination of the focal length of the photo-taking lens assembly and the distance to the target object with the distance between the firing window of the extra flash unit and the optical axis of the photo-taking lens assembly so that a warning of whether or not the pre-firing should be effected can be provided. In such case, the data of the distance may suffice to be the one indicative of whether or not the distance is greater or smaller than a predetermined value, or may comprise a plurality of data having a resolving power similar to the other data (focal length and the distance to the target object).

Also, where any one of the extra flash units 101 and 102 shown respectively in FIGS. 12(a) and 12(b) have no pre-firing capability, arrangement may be made that the extra flash unit 102 which is required to effect the pre-firing can output to the camera a signal indicative of the necessity of the pre-firing by a flash unit built-in the camera and that the extra flash unit 101 which does not require the pre-firing can output to the camera a signal indicative of the unnecessity of the pre-firing. In such case, depending on the necessity, it is possible that, when the extra flash unit 102 is mounted on the camera, a display indicating that the prefiring is necessary can be made, or when the extra flash unit 101 is mounted on the camera, no display indicating that the pre-firing is necessary can be made.

Yet, arrangement may be made that, during a period in which the film is exposed, the built-in flash unit in the camera will not be fired, but only the pre-firing may take place.

The "Fired Light Amount" data outputs the data of the amount of light fired according to the output from the charge detecting circuit CHDC and is utilized as one of parameters necessary to determine the aperture in the camera body and to determine whether or not the possibility of occurrence of the red-eye phenomenon is high. The "Opposed/Not Opposed" signals is such that, when and so long as the flash firing window of the flash unit mounted directly on the accessory shoe on the camera body is held in the opposed position, the "Opposed" signal is supplied, whereas the "Not Opposed" signal is outputted when and so long as the flash unit is not mounted directly on the accessory shoe on the camera body or the flash firing window of the flash unit mounted directly on the accessory shoe on the camera body is held in the bounce lighting position. The camera body makes a decision to determine whether or not, when the flash unit is opposed to the target object, the pre-firing is to be effected by the extra flash unit and, if it is determined that the pre-firing is necessary, the pre-firing signal is supplied from the camera body to the flash unit. On the other hand, when the signal indicative of the flash unit not opposed to the target object is supplied to the camera, it is determined that the optical path of the flash firing window and the optical axis of the lens assembly are not close to each other and, therefore, there is no possibility of occurrence of the red-eye phenomenon, and accordingly, the pre-firing signal will not be transmitted from the camera to the flash unit with no actual pre-firing taking place.

Figure 16:
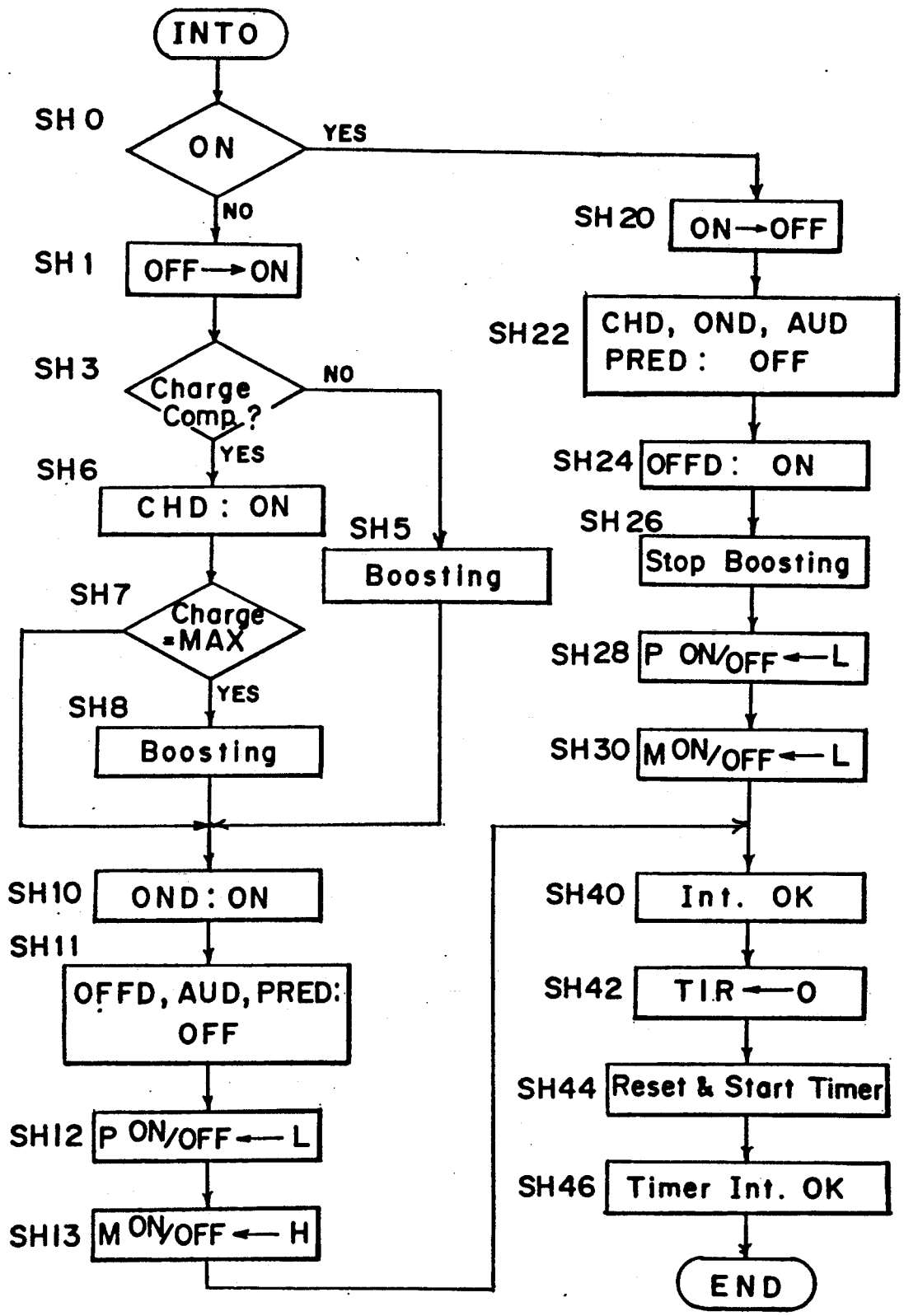

FIG. 16 illustrates a flowchart showing the sequence of operating resulting from the manipulation of the main switch MSW. When the flash microcomputer FCPU is started in response to an interruption signal applied to the interruption terminal INTO as a result of the manipulation of the main switch MSW, a decision is made at step SHO to determine if the mode then prevailing is the ON mode. If it indicates the ON mode, the program flow proceeds to step SH20, or otherwise to step SH1.

At step SH1, the mode is changed from the OFF mode to the ON mode, followed by a decision at step SH3 to determine if the charge has been attained a charge completion level. If it has not yet attained the charge completion level, the voltage boosting operation of the power circuit HVG is initiated at step SH5, followed by step SH10. On the other hand, if the result of decision at step SH3 indicates that the charge has attained the charge completion level, the light emitting diode CHD for indicating the completion of the charge is lit at step SH6, followed by a decision at step SH7 to determine if the charge level has attained a maximum level (a saturation level). If the result of decision at step SH7 indicates that the charge has not yet attained the maximum level, the voltage boosting is initiated at step SH8, but if it indicates that the charge has attained the maximum level, the program flow proceeds to step SH10 without the voltage boosting taking place. As will be described later, since during the OFF mode, the light emitting diode CHD is switched off, the light emitting diode CHD is left as it is if the charging has not been completely carried out.

At step SH10, the light emitting diode OND for indicating the ON mode is lit, followed by step SH11 at which the light emitting diode OFFD for indicating the OFF mode, the light emitting diode AUD for indicating the automatic firing mode and the light emitting diode PRED for indicating the pre-firing mode are all switched off. Then, the pre-firing is disabled at step SH12 and the actual firing is enabled at step SH13, followed by step SH40. By the foregoing operation, the mode is changed from the OFF mode to the ON mode with the flash unit consequently set in an initial condition under the ON mode.

Should the result of decision at step SHO indicate that the mode then prevailing is the ON mode, the mode is changed from the ON mode to the OFF mode at step SH20. Then, at step SH22 the light emitting diode OND for indicating the ON mode, the light emitting diode AUD for indicating the automatic firing mode and the light emitting diode PRED for indicating the pre-firing mode are all switched off. Also, the light emitting diode OFFD for indicating the OFF mode is lit at step SH24 to show that the mode is in the OFF mode, followed by the termination of the voltage boosting at step SH26. Thereafter, the pre-firing and the actual firing are successively disabled at steps SH28 and SH30, respectively, with the program flow subsequently proceeding to step SH40. by the foregoing operation, the setting in the OFF mode is completed.

At step SH40, reception of the interruption signal by the terminals INTO and INT1 is permitted, followed by the resetting of a register TIR for a timer at step SH42. Then, a built-in timer is reset and, at the same time, the counting is started at step SH44, thereby enabling an interruption by the timer to interrupt the operation at step SH46. The interrupting operation of the timer will be described later with reference to the flowchart of FIG. 19.

Figure 17:
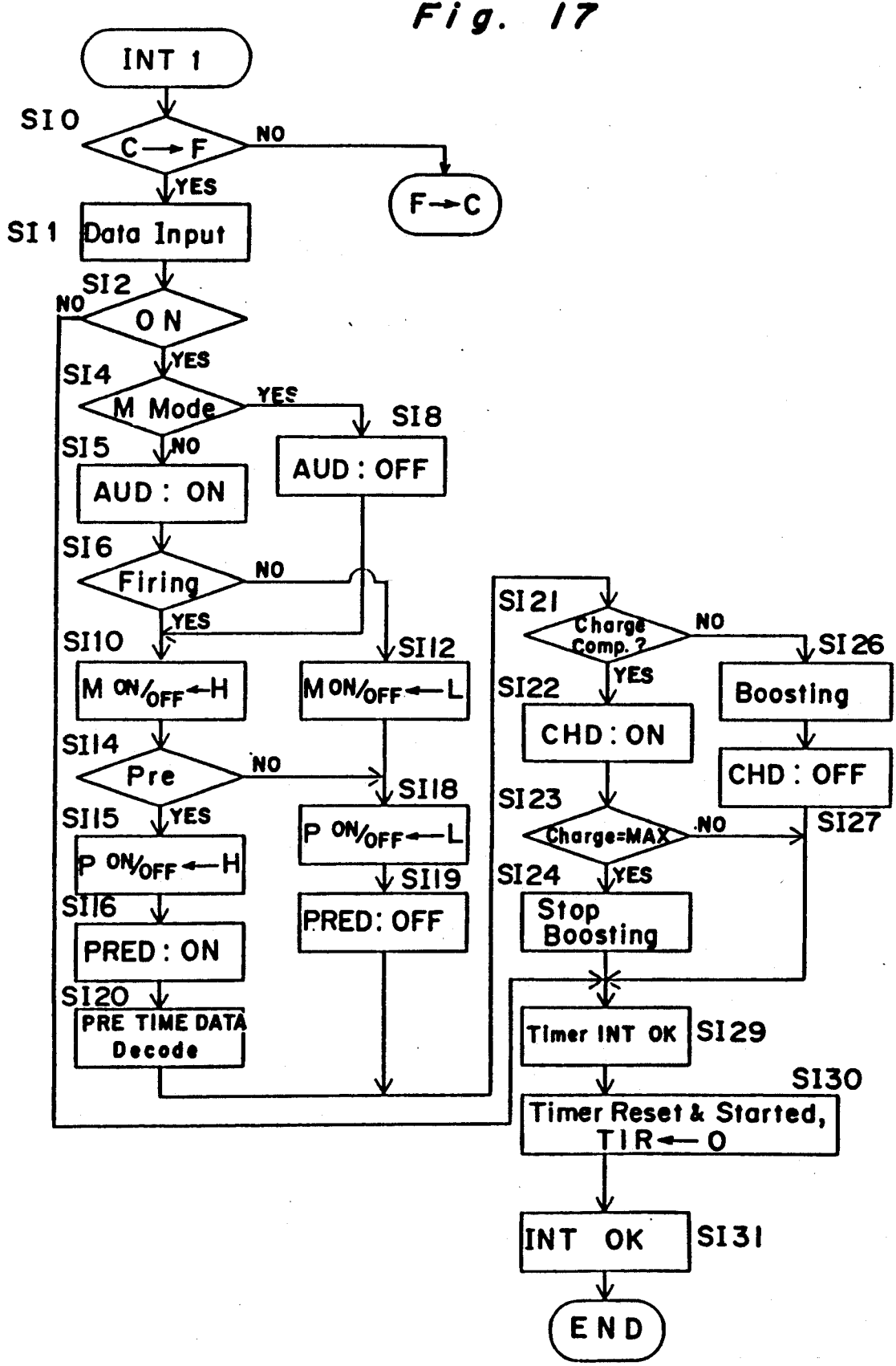
Figure 18:
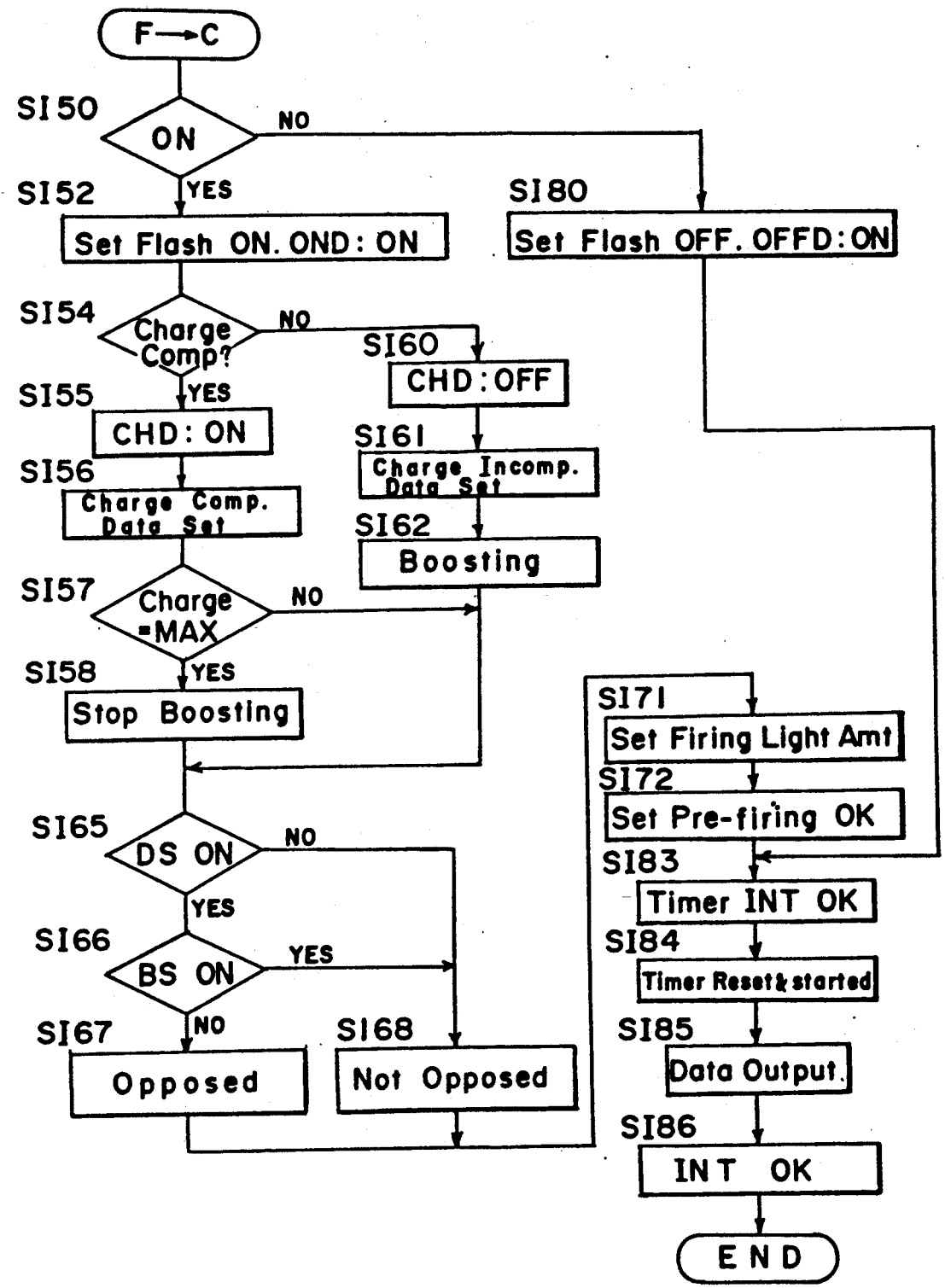

FIGS. 17 and 18 illustrate flowcharts of the respective sequences of operation which takes place when the flash microcomputer FCPU is started as a result of the low level state at the chip select terminal CSF when the data communication is to be done between the camera body and the flash unit. At the outset, at step SI0, a decision is made to determine whether a condition is established in which the data are to be transmitted from the camera body to the flash unit or whether a condition is established in which the data are to be transmitted from the flash unit to the camera body, which decision is made in reference to the status of the R/W terminal. If the R/W terminal is in a high level state and the condition is such that the data are to be transmitted from the camera body to the flash unit, the program flow starts from step SI1 shown in FIG. 17, but if the R/W terminal is in a low level state and the condition is such that the data are to be transmitted from the flash unit to the camera body, the program flow shown in FIG. 18 is executed.

Referring to FIG. 17, at step SI1, the various data shown in the foregoing table and supplied serially from the camera body are inputted. Then, at step SI2, a decision is made to determine if it is in the ON mode and, if it is in the ON mode, the program flow proceeds to step SI4, but if it is in the OFF mode, the program flow from step SI4 to step SI24 does not take place and a process for the interruption from step SI29 to step SI31 is executed, followed by the interruption of the operation. At step SI4, a decision is made to determine if the data of the exposure control mode inputted from the camera body represents the M mode, and if it represents the M mode, it means the forced firing mode and, therefore, the light emitting diode AUD for the indication of the automatic firing mode is switched off at step SI8, followed by step SI10. On the other hand, if it does not represent the M mode, it means the automatic firing mode and, therefore, the light emitting diode AUD is switched on at step SI5, followed by a decision at step SI6 to determine if the actual firing is necessary. If the actual firing is not necessary as determined at step SI6, the terminal $M_{ON/OFF}$ is brought in a low level state at step SI12 to establish a condition in which the actual firing is inhibited, followed by step SI18.

Where the data indicating that the actual firing is necessary is inputted during the forced firing mode and the automatic firing mode, step SI10 takes place to bring the terminal $M_{ON/OFF}$ in a high level state to establish a condition in which the firing is enabled. Then at step SI14, a decision is made to determine if the pre-firing is necessary, and if the pre-firing is necessary, the terminal $P_{ON/OFF}$ is brought in a high level state to enable the pre-firing at step SI15 and the light emitting diode PRED for the indication of the pre-firing is switched on at step SI16, followed by step SI20. At step SI20, the length of time during which the pre-firing is carried out is determined in reference to the charged level of the main capacitor and the amount of pre-fired light supplied from the camera body and this data PRE TIME DATA is supplied to the timer TI1 for the control of the firing. Then, the program flow proceeds to step SI21. On the other hand, if the result of decision at step SI14 indicates that the pre-firing is unnecessary, the terminal $P_{ON/OFF}$ is brought in the low level state to disable the pre-firing and the light emitting diode PRED is switched off at step SI19, followed by step SI21. It is to be noted that, since when no firing is required under the automatic firing mode the pre-firing is not necessary, the program flow proceeds from step SI12 immediately to step SI18.

At step SI21, a decision is made to determine if the voltage charged on the main capacitor has attained the charge completion level, and if it has attained the charge completion level, the light emitting diode CHD is switched on at step SI22, followed by a decision at step SI23 to determine if the charged voltage level has attained the saturation level. If it has attained the saturation level, the boosting is ceased at step SI24, followed by step SI29. On the other hand, if it has not yet attained the saturation level, the program flow proceeds to step SI29 for permitting the boosting to continue or to continue a condition in which the boosting is ceased. On the other hand, if the result of decision at step SI21 indicates that the charged voltage level has not attained the charge completion level, the boosting is initiated at step SI26 and the light emitting diode CHD for the indication of the completion of the charging is switched off at step SI27, followed by step SI29. As hereinabove described, in this type of the flash unit, the boosting continues until the voltage charged on the main capacitor attains the saturation level and, in the event that is lowers down to the charge completion level, the boosting is resumed. Also, the light emitting diode CHD is switched on if the charged voltage is higher than the charge completion level. At step SI29, the interruption by the timer is permitted and the timer is reset and started, followed by step SI30 at which the register TIR for the timer is reset. At subsequent step SI31, reception of the stop signal by the terminals INTO and INT is permitted to halt the operation.

In the event that the result of decision at step SI0 indicates that the condition is established in which the data are to be transmitted from the camera to the flash unit, the program flow of FIG. 18 is executed from step SI50 at which a decision is made to determine if it is in the ON mode. If it is in the OFF mode, the data for the transmission indicative of the flash unit in the OFF mode are set and the light emitting diode OFFD for the indication of the OFF mode of the flash unit is switched on at step SI80, followed by the execution of a program flow from step SI83 to step SI86 for the interruption followed by step SI85 at which the data indicative of the OFF mode are transmitted, with the operation subsequently ceased.

Should the result of decision at step SI50 indicate the ON mode of the flash unit, an operation for the preparation of various data to be transmitted is carried out at step SI52 et seqq. More specifically, at step SI52, the data indicating that the flash unit is ON is set and the light emitting diode OND for the indication of the ON mode is switched on. During the program flow from step SI54 to step SI58 and also that from step SI60 to step SI62, decisions as to the charge completion level and the saturation level and their associated displays and the control of the boosting are carried out in respective manners similar to those executed at steps SI21 to SI24, SI26 and SI27 of the routine of FIG. 17 except for steps SI56 and SI61. At step SI56, the data for transmitting the completion of the charging is set and, at step SI62, the data for transmitting the incomplete charging is set.

At step SI65, a decision is made in reference to the status of the switch DS to determine if the flash unit is directly mounted on the camera body, and if it is not directly mounted, the data indicating that the flash firing window is not opposed to the target object is set at step SI68, followed by step SI71. Should the result of decision at step SI65 indicate that the flash unit is directly mounted on the camera body, a decision is made at step SI66 in reference to the status of the switch BS to determine if the flash firing window is set in the bounce lighting position, and if it is in the bounce lighting position, the data indicating that the flash firing window is not opposed to the target object is set at step SI68, followed by step SI71. On the other hand, if the flash unit is directly mounted and the flash firing window is not set in the bounce lighting position, the data indicating that the flash firing window is opposed to the target object is set at step SI67, followed by step SI71.

At step SI71, the data of the amount of fired light which will be produced upon the actual firing is calculated from the voltage charged on the main capacitor and this data is set. Then, the data indicating that the pre-firing is permitted is set and, after operations similar to those at steps SI29 and SI30 of FIG. 17 have been executed at step SI83 and step SI84, the data set up until this time are serially transmitted to the camera body at step SI85. Then the reception of the interruption signal by the terminals INT0 and INT1 is permitted, followed by the termination of the operation.

Figure 19:
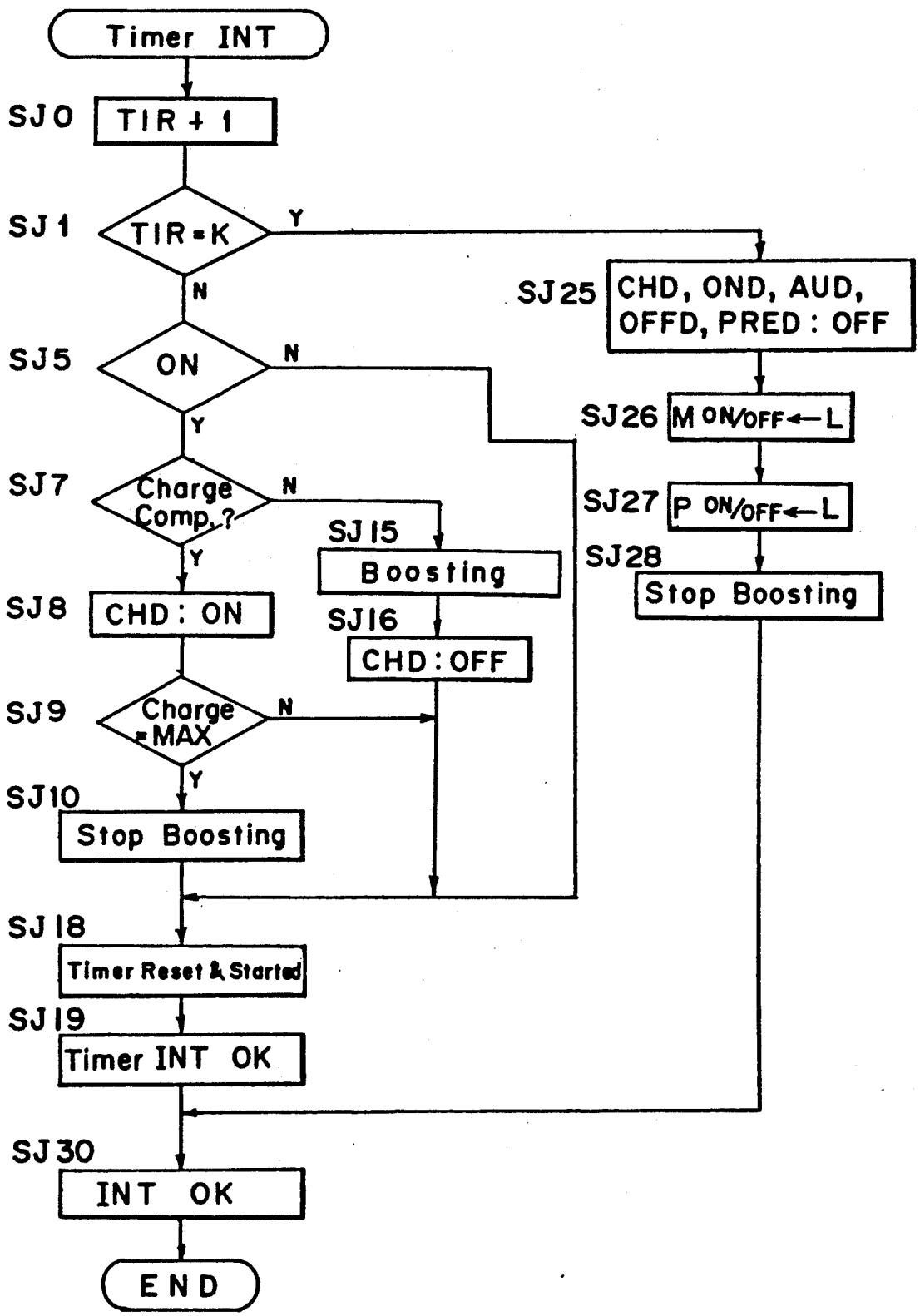

FIG. 19 illustrates a flowchart showing the sequence of operation which takes place when the timer interruption is enabled and when started by the interruption signal outputted each time the timer counts the predetermined time. After the passage of a predetermined time, for example, 250 msec, subsequent to start of the counting operation of the timer, the program flow starts with step SJ0. At step SJ0 the contents of the timer register TIR is incremented by 1, followed by step SJ1 at which a decision is made to determine if the contents of the timer register TIR has attained K (for example, 16). If it has not yet attained K, it means that the predetermined time (250 msec × 16 = 4 sec) has not yet been passed subsequent to the termination of the operations shown in FIGS. 16, 17 and 18 and, therefore, the program flow proceeds to step SJ5 to determine if it is in the ON mode. If it is in the ON mode, operations similar to steps SI21 to SI24, SI26 and SI27 of FIG. 17 are carried out at steps SJ7 to SJ10, SJ15 and SJ16, but if it is not in the ON mode, no operation associated with the voltage boosting is carried out and the program flow proceeds to step SJ18. At steps SJ18 and SJ19, operations are performed for the subsequent timer interruption and the reception of the interruption signal to the terminals INT0 and INT1 is enabled at step SJ30 with the operation subsequently terminated. On the other hand, if the contents of the timer register TIR has attained K at step SJ1, that is, after the passage of the predetermined time, for example, 4 seconds, subsequent to the termination of the operation for the data transmission between the camera and the flash unit or the termination of the operation resulting from the manipulation of the main switch MSW, all of the display light emitting diodes are switched off at step SJ25, and the terminals $M_{ON/OFF}$ and $P_{ON/OFF}$ are brought in a low level state to inhibit the pre-firing and the actual firing while the boosting is ceased to permit the interruption signal to be received by the terminals INT0 and INT1, with the operation subsequently interrupted.

Figure 23A:
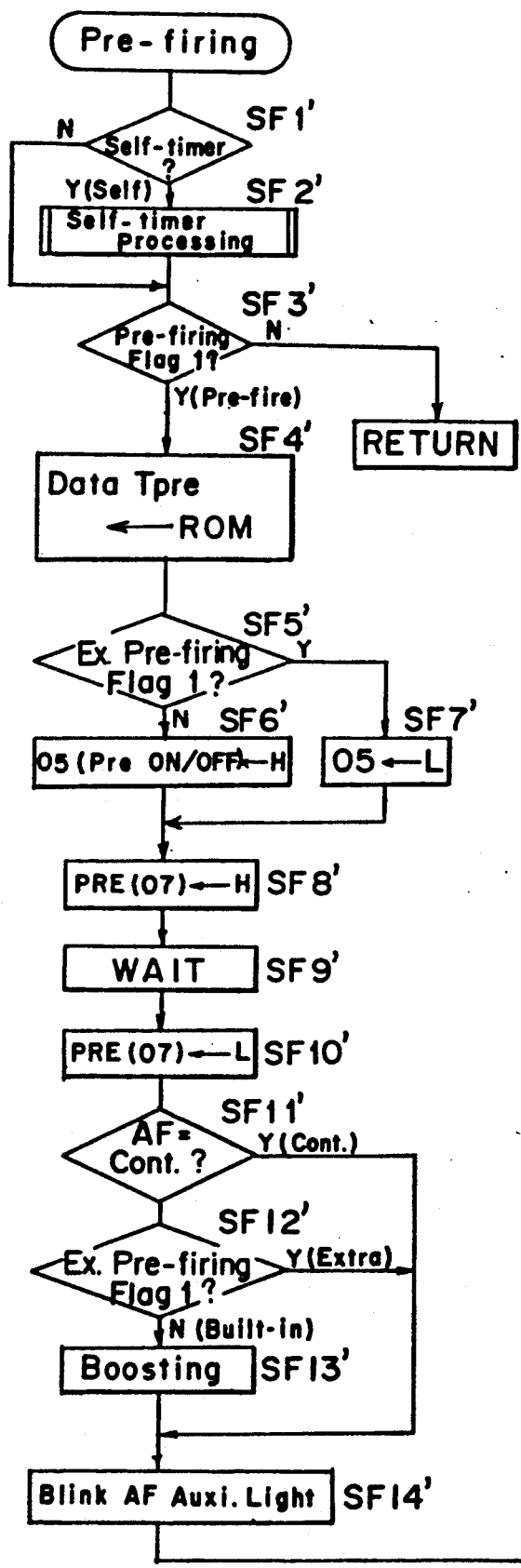
FIGS. 23(a) and 23(b) are flowcharts showing another embodiment of the camera according to the present invention.
Figure 23B:
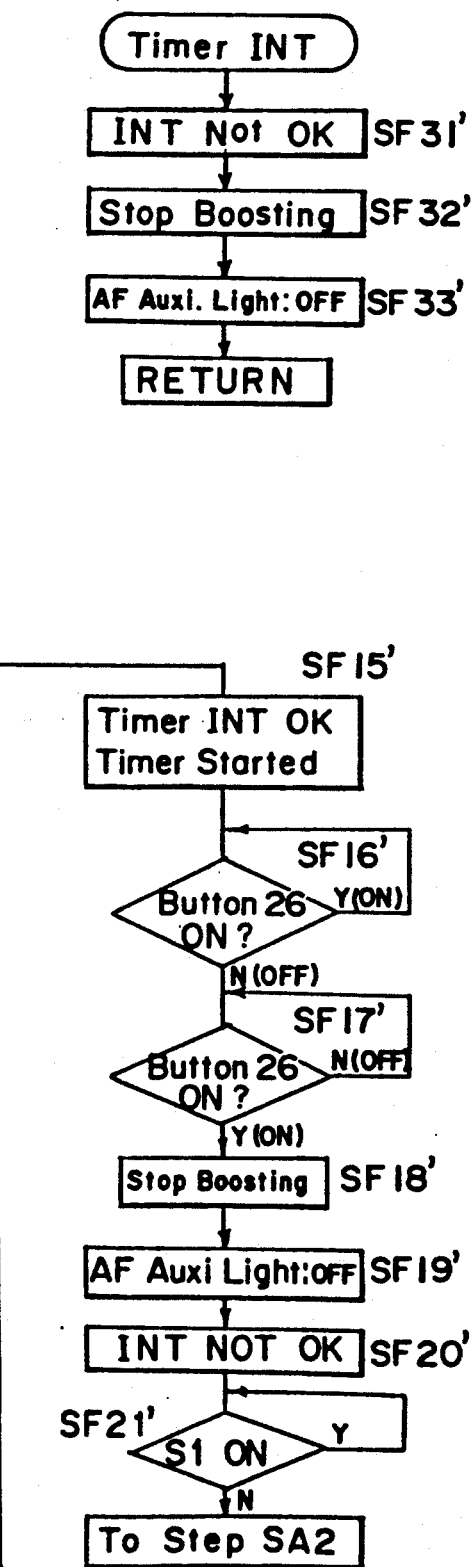

FIGS. 23(a) and 23(b) illustrate another preferred embodiment of the present invention. According to this alternative embodiment of the present invention, the program flow from steps SF1 to SF17 shown in FIG. 10 is modified to enable the exposure control operation to be inhibited subsequent to the pre-firing.

With reference to FIG. 23(a), the program flow from step SF1' to step SF14' is identical with that from step SF1 to step SF14 of FIG. 10 and, therefore, the description thereof will not reiterated for the sake of brevity. At step SF15', the timer for counting the time interval Tpre between the pre-firing and the exposure control operation is started. This timer is so designed as to generate an interruption signal after the passage of the time interval Tpre subsequent to the start thereof. Also, at step SF15', this timer interruption is enabled.

At step SF16', a decision is made to determine if the pre-firing button 26 is depressed. If it is depressed, step SF16' is repeated. On the other hand, if the pre-firing button 26 is released (OFF), the program flow proceeds to step SF17' at which a decision is made again to determine if the pre-firing button 26 is depressed. If the result of decision at step SF17' indicates that the pre-firing button 26 is OFF, step SF17' is repeated, but if it indicates that the pre-firing button 26 is ON, the program flow proceeds to step SF18'.

In other words, if during the time interval between the pre-firing and the exposure control operation, the prefiring button 26 is released at step SF16' and is again depressed at step SF17', the program flow proceeds to step SF18'. At step SF19', the boosting is ceased and, at step SF18', an AF auxiliary light is switched off. At step SF20', the interruption of the timer is disabled, inhibiting the interruption by the timer for counting the time interval Tpre. At step SF21', a decision is made to determine the status of the switch S1, and if it is released, the program flow proceeds to step SA2. If it is not separated, step SF21' is repeated. Thus, the exposure control operation will not take place by the renewal depression of the pre-firing button.

While in this embodiment the pre-firing button has been used to inhibit the exposure control operation, it may be accomplished by the use of a different button. If the pre-firing button is left depressed or released subsequent to the pre-firing, the program flow of step SF16' or step SF17' is repeated.

When during this condition the interruption occurs by the timer for counting the time interval Tpre, the program flow proceeds to step SF31' at which the interruption is disabled, followed by step SF32' at which the boosting is ceased. Then, at step SF33', the AF auxiliary light is switched off with the program flow subsequently returning to the main routine to perform the exposure control operation.

Thus, from the foregoing description, it is clear that, since the camera automatically determines if the preliminary firing is required, most users of the photographic camera can readily and easily recognize the necessity of the pre-firing. Also, since a preliminary firing means is actuated in response to the manipulation of an operating means, the preliminary firing can be carried out, only when the preliminary firing is required, on the basis of a display made by a display means for indicating the necessity of the preliminary firing and, therefore, the possible occurrence of the red-eye phenomenon can be avoided thereby avoiding any possible waste of an electric power. At the same time, when the preliminary firing is effected, the photographer is aware of the occurrence of the preliminary firing and, therefore, the photographer can warn the target object that the preliminary firing may take place.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A photographic camera which comprises:
   flash firing means for firing a flash light for illuminating a target object to be photographed when an image of the target object is desired to be exposed on a light sensitive film;
   preliminarily flash firing means activated prior to the flash light fired by the flash firing means to emit a preliminary flash light necessary to cause the pupils of the target object to constrict;
   mode selecting means for selecting a mode by a manual operation, between a first mode in which the preliminarily flash firing means is enabled and a second mode in which the preliminarily flash firing means is disabled;
   determining means for determining the necessity of the preliminary flash light under a predetermined condition; and
   display means for providing, on the basis of a result of the determination made by the determining means, an indication that the preliminary flash light is necessary under the second mode.

2. The camera as claimed in claim 1, further comprising second display means for providing an indication that the preliminary flash firing is carried out in response to a manipulation of the mode selecting means prior to the activation of the preliminarily flash firing means.

3. The camera as claimed in claim 1, wherein said determining means includes measuring means for measuring a brightness of the target object and operable to determine that the preliminarily flash firing means should be activated to emit the preliminary flash light when the brightness of the target object measured by said measuring means is lower than a predetermined value.

4. The camera as claimed in claim 3, wherein said determining means further includes magnification detecting means for detecting the magnification at which the target object is photographed and is operable to determine that the preliminarily flash firing means should be activated to emit the preliminary flash light when the magnification detected by said magnification detecting means is higher than a predetermined value.

5. The camera as claimed in claim 4, wherein said magnification detecting means includes a distance measuring means for measuring a distance to the target object and a focal length detecting means for detecting the focal length of a photo-taking lens assembly mounted on the camera and is operable to determine the magnification in reference to the measured distance and the detected focal length.

6. The camera as claimed in claim 3, wherein said determining means further includes distance measuring means for measuring a distance to the target object and is operable to determine that the preliminarily flash firing means should be activated to emit the preliminary flash light when the distance measured by said distance measuring means is greater than a predetermined value.

7. The camera as claimed in claim 6, wherein said determining means further includes output means for outputting a flash available distance range operatively associated with the flash firing means and is operable to determine that the preliminarily flash firing means should not be activated to emit the preliminary flash light when the the distance to the target object is out of the flash available distance range.

8. A photographic camera which comprises:
   flash firing means for firing a flash light for illuminating a target object to be photographed when a light sensitive film is to be exposed;
   preliminarily flash firing means activated prior to the flash light fired by the flash firing means to emit a preliminary flash light necessary to cause the pupils of the target object to constrict;
   continuous photo-taking means for effecting a continuous photo-taking operation;
   flash firing control means for controlling the flash firing means to cause the latter to be activated to emit the flash light each time each one of a plurality of frames of the light sensitive film is exposed during the continuous photo-taking operation; and
   preliminary flash firing control means for activating the preliminarily flash firing means only at the first exposure during the continuous photo-taking operation.

9. A photographic camera which comprises:
   flash firing means for firing a flash light for illuminating a target object to be photographed when a light sensitive film is to be exposed;
   preliminarily flash firing means activated prior to the flash light fired by the flash firing means to emit a preliminary flash light necessary to cause the pupils of the target object to constrict;
   magnification detecting means for detecting the magnification at which the target object is to be photographed; and
   control means for controlling the amount of the preliminary flash light, emitted by the preliminarily flash firing means, in dependence on the magnification detected by said magnification detecting means.

10. A photographic camera which comprises:
    flash firing means, comprising a flash light emitter, for firing a flash light for illuminating a target object to be photographed when a light sensitive film is to be exposed;
    preliminarily flash firing means activated prior to the flash light fired by the flash firing means to emit a preliminary flash light necessary to cause the pupils of the target object to constrict;
    charge accumulating means for accumulating an electric charge necessary to cause the flash firing means and the preliminarily flash firing means to emit the flash light and the preliminary flash light, respectively; and
    control means operable to cause the charge accumulating means to accumulate the electric charge until photo-taking is initiated subsequent to the emission of the preliminary flash light from the preliminarily flash firing means.

11. A photographic camera for use with an electronic flash device detachably attached to the camera for illuminating a target object to be photographed when a light sensitive film is to be exposed, which comprises:
    flash firing means for ordering said flash device to fire a flash light;
    preliminarily flash firing means activated prior to the flash light fired by the flash firing means to emit a preliminary flash light necessary to cause pupils of the target object to constrict and, receiving means for receiving information from said flash device related with the preliminary flash firing which depend on a condition of the attached flash device; and determining means for determining the necessity of the preliminary flash light in dependence on said information.

12. A flash device for use on a photographic camera for emitting a flash light necessary to illuminate a target object to be photographed when a light sensitive film is to be exposed to the target object while the flash lighting device is detachably mounted on the camera, which device comprises:

preliminarily flash firing means activated prior to the exposure to emit a preliminary flash light necessary to cause the pupils of the target object to constrict; and indicating means for indicating the unnecessity of the preliminary flash firing performed by the camera.

13. A photographic camera which comprises:

flash firing means for firing a flash light for illuminating a target object to be photographed when a light sensitive film is to be exposed;

preliminarily flash firing means activated prior to the flash light fired by the flash firing means to emit a preliminary flash light necessary to cause the pupils of the target object to constrict;

automatic focus adjusting means;

detecting means for detecting whether or not the target object to be photographed is under motion;

determining means for determining the necessity of the preliminary flash firing, performed by the preliminarily flash firing means; and means for inhibiting the preliminary flash firing when the target object is under motion independent of a result of the determination by the determining means.

14. A photographic camera system which comprises:
a camera body;
a flash device adapted to be detachably mounted on the camera body for firing a flash light for illuminating a target object to be photographed when a light sensitive film is to be exposed; and
preliminarily flash firing means activated prior to the exposure to emit a preliminary flash light necessary to cause the pupils of the target object to constrict;
said flash device including detecting means for detecting whether or not the flash device is directly mounted on the camera body;
detecting means for detecting whether or not the preliminary flash firing is necessary;
determining means operable, when said detecting means detects that the flash device is not directly mounted on the camera body, to determine that the emission of the preliminary flash light by the preliminarily flash firing means is not necessary independent of a result of a detection by said detecting means; and
means for inhibiting the emission of the preliminary flash light by the preliminarily flash firing means when said determining means determines that the emission is not necessary.

15. A flash device for use on a photographic camera;
flash firing means having a flash firing window for emitting a flash light necessary to illuminate a target object to be photographed when a light sensitive film is to be exposed to the target object while the flash lighting device is detachably mounted on the camera;
preliminarily flash firing means activated prior to the exposure to emit a preliminary flash light necessary to cause the pupils of the target object to constrict;
support means for supporting the flash firing window for adjustment between a first position, in which the flash firing window is oriented substantially parallel to an optical axis of a photo-taking lens assembly, and a second position in which the flash firing window is oriented in a direction deviating from the optical axis of the photo-taking lens assembly;
determining means for determining whether or not the preliminary flash firing is necessary;
detecting means for detecting that the flash firing window is not held in the first position; and
means for inhibiting the emission of the preliminary flash light by the preliminarily flash firing means when the flash firing window is not held in the first position, independent of a determination of the determining means.

16. A flash photography system which comprises:
a camera body;
a flash device adapted to be detachably mounted on the camera body for firing a flash light for illuminating a target object to be photographed when a light sensitive film is to be exposed; and
preliminarily flash firing means activated prior to the flash light fired by the flash firing means to emit a preliminary flash light necessary to cause the pupils of the target object to constrict;
wherein said flash device includes a transmitting means for transmitting to the camera body information indicative of the provision of the preliminarily flash firing means when the flash device is mounted on the camera body, and said camera body is capable of performing a photo-taking on the basis of the information transmitted thereto from the transmitting means.

17. A flash photography system which comprises:
a camera body including a main flash firing means for firing a flash light for illuminating a target object to be photographed when a light sensitive film is to be exposed, and a preliminarily flash firing means activated prior to the flash light fired by the flash firing means to emit a preliminary flash light necessary to cause the pupils of the target object to constrict; and
an extra flash device adapted to be detachably mounted on the camera body and including extra flash firing means for firing an extra flash light for illuminating the target object when the light sensitive film is to be exposed;
wherein both of said preliminarily flash firing means and said extra flash firing means are activated to illuminate the target object during a photo-taking when the extra flash device is mounted on the camera body.

18. A photographic camera which comprises:
flash firing means for firing a flash light for illuminating a target object to be photographed when a light sensitive film is to be exposed;
preliminarily flash firing means activated prior to the flash light fired by the flash firing means to emit a preliminary flash light necessary to cause the pupils of the target object to constrict;

setting means for setting that the preliminarily flash firing means should be activated to emit the preliminary flash light; and manipulating means installed in a camera body at a location rearwardly and upwardly of said camera body for setting said setting means.

19. A photographic camera which comprises:

flash firing means for firing a flash light for illuminating a target object to be photographed when an image of the target object is desired to be exposed on a light sensitive film;

preliminarily flash firing means activated prior to the flash light fired by the flash firing means to emit a preliminary flash light necessary to cause the pupils of the target object to close;

determining means for determining the necessity of the preliminary flash light; and control means for controlling in dependence on a result of determination performed by said determining means for activating said preliminarily flash firing means;

said determining means including distance measuring means for measuring a distance to the target object and output means for outputting a flash available distance range operatively associated with the flash firing means and being operable to determine that the preliminarily flash firing means should not be activated to emit the preliminary flash light when the distance to the target object is out of the flash available distance range.

20. A flash photography system which comprises:

a camera body including a main flash firing means for firing a flash light for illuminating a target object to be photographed when a light sensitive film is to be exposed, and a preliminarily flash firing means activated prior to the flash light fired by the flash firing means to emit a preliminary flash light necessary to cause the pupils of the target object to constrict; and an extra flash device adapted to be detachably mounted on the camera body and including extra flash firing means for firing an extra flash light for illuminating the target object when the light sensitive film is to be exposed;

wherein only the extra flash firing means is activated to illuminate the target object when the extra flash device is mounted on the camera body.

* * * * *

UNITED STATES PATENT AND TRADEMARK OFFICE
CERTIFICATE OF CORRECTION

PATENT NO. : 5,202,720

DATED : April 13, 1993

INVENTOR(S) : Akihiko Fujino, et al.

It is certified that error appears in the above-identified patent and that said Letters Patent is hereby corrected as shown below:

On the cover page: Item [21] change the Appl. No. from "747,713" to --472,713--.

In col. 8, line 62, change "as" to --at--.

In col. 9, line 7, change "of" to --to--.

In col. 19, line 49, change "through" to --though--.

In col. 21, line 6, change "illustrate" to --illustrates--.

In col. 21, line 19, change "rterminal" to --terminal--.

In col. 25, last line, change "operating" to --operation--.

Signed and Sealed this

First Day of March, 1994

Attest:

BRUCE LEHMAN

Attesting Officer

Commissioner of Patents and Trademarks